United States Patent
Ha et al.

(10) Patent No.: US 11,561,584 B2
(45) Date of Patent: Jan. 24, 2023

(54) ELECTRONIC DEVICE HAVING PLURALITY OF DISPLAYS ENCLOSING MULTIPLE SIDES AND METHOD FOR CONTROLLING SAME

(71) Applicant: Samsung Electronics Co., Ltd., Gyeonggi-do (KR)

(72) Inventors: Dohyung Ha, Seoul (KR); Jungsik Park, Gyeonggi-do (KR); Jaeyoung Shin, Gyeonggi-do (KR); Chongyoon Chung, Seoul (KR); Namsu Kim, Seoul (KR); Geonsoo Kim, Gyeonggi-do (KR); Byounguk Yoon, Gyeonggi-do (KR); Hyunju Hong, Gyeonggi-do (KR)

(73) Assignee: Samsung Electronics Co., Ltd

(*) Notice: Subject to any disclaimer, the term of this patent is extended or adjusted under 35 U.S.C. 154(b) by 0 days.

(21) Appl. No.: 17/360,528

(22) Filed: Jun. 28, 2021

(65) Prior Publication Data

US 2021/0325931 A1    Oct. 21, 2021

Related U.S. Application Data

(62) Division of application No. 15/766,274, filed as application No. PCT/KR2016/011131 on Oct. 5, 2016, now Pat. No. 11,079,803.

(30) Foreign Application Priority Data

Oct. 5, 2015 (KR) .......................... 10-2015-0139898

(51) Int. Cl.
*G06F 1/16* (2006.01)
*G06F 1/18* (2006.01)
(Continued)

(52) U.S. Cl.
CPC .............. *G06F 1/1652* (2013.01); *G06F 1/16* (2013.01); *G06F 1/1626* (2013.01);
(Continued)

(58) Field of Classification Search
CPC .... G06F 1/1652; G06F 1/1635; G06F 1/1641; G06F 1/1686; G06F 1/1688; G06F 1/183;
(Continued)

(56) References Cited

U.S. PATENT DOCUMENTS 5,612,732 A    3/1997  Yuyama et al.
5,854,997 A *  12/1998  Sukeda ................... G06F 40/45
                                                 704/7
(Continued)

FOREIGN PATENT DOCUMENTS

CN    101442570    5/2009
CN    101647262    2/2010
(Continued)

OTHER PUBLICATIONS

Chinese Office Action dated Jul. 14, 2021 issued in counterpart application No. 201680058790.6, 7 pages.
(Continued)

*Primary Examiner* — Kwang-Su Yang
(74) *Attorney, Agent, or Firm* — The Farrell Law Firm, P.C.

(57) ABSTRACT

An electronic device and method for controlling the electronic device are provided. The electronic device includes a first surface in a first direction, a second surface in a second direction opposite to the first direction, and a third surface enclosing at least a portion of a space formed between the first surface and the second surface. The electronic device also includes an audio module changing an audio signal input to the electronic device into an electronic signal, and a processor being operationally connected to the display and
(Continued)

the audio module. The processor is configured to detect the audio signal input via the audio module from a first user via the first surface, detect a touch signal dragged from the third surface in the direction of the second surface, and display in the second surface a translation corresponding to the audio signal.

16 Claims, 33 Drawing Sheets

(51) Int. Cl.
| | |
|---|---|
| H01Q 1/24 | (2006.01) |
| H04M 1/02 | (2006.01) |
| G06F 3/041 | (2006.01) |
| H01Q 1/44 | (2006.01) |
| H01Q 1/52 | (2006.01) |
| G06F 3/0488 | (2022.01) |
| G06F 3/04883 | (2022.01) |
| H01Q 9/42 | (2006.01) |
| H01Q 7/00 | (2006.01) |

(52) U.S. Cl.
CPC .......... *G06F 1/1635* (2013.01); *G06F 1/1641* (2013.01); *G06F 1/1658* (2013.01); *G06F 1/1686* (2013.01); *G06F 1/1688* (2013.01); *G06F 1/181* (2013.01); *G06F 1/183* (2013.01); *G06F 3/041* (2013.01); *G06F 3/0412* (2013.01); *G06F 3/04883* (2013.01); *H01Q 1/243* (2013.01); *H01Q 1/44* (2013.01); *H01Q 1/526* (2013.01); *H04M 1/0266* (2013.01); *H04M 1/0268* (2013.01); *H01Q 7/00* (2013.01); *H01Q 9/42* (2013.01); *H04M 2250/16* (2013.01)

(58) Field of Classification Search
CPC . G06F 1/16; G06F 3/041; G06F 1/181; G06F 1/1658; G06F 3/0412; G06F 3/04883; G06F 1/1626; H01Q 9/42; H01Q 1/243; H01Q 1/44; H01Q 1/526; H04M 1/0268; H04M 1/0266
See application file for complete search history.

(56) References Cited

U.S. PATENT DOCUMENTS

| | | | |
|---|---|---|---|
| 6,118,653 A | 9/2000 | Kim | |
| 6,262,883 B1 | 7/2001 | Kim | |
| 7,173,665 B2 | 2/2007 | Kawasaki et al. | |
| 8,116,824 B2 | 2/2012 | Choi | |
| 8,442,600 B1 | 5/2013 | Tseng | |
| 8,654,030 B1 | 2/2014 | Mercer | |
| 2005/0237699 A1* | 10/2005 | Carroll | G06F 1/1622 361/600 |
| 2005/0254674 A1 | 11/2005 | Huang et al. | |
| 2005/0276022 A1 | 12/2005 | Xu | |
| 2008/0252536 A1 | 10/2008 | Anguera | |
| 2009/0290089 A1 | 11/2009 | Ichioka et al. | |
| 2010/0029349 A1 | 2/2010 | Ogatsu | |
| 2010/0198580 A1* | 8/2010 | Klinefelter | G06Q 10/10 704/3 |
| 2010/0271769 A1 | 10/2010 | Shanmugam et al. | |
| 2010/0283860 A1 | 11/2010 | Nader | |
| 2012/0105317 A1 | 5/2012 | Oka | |
| 2012/0105400 A1 | 5/2012 | Mathew et al. | |
| 2013/0086508 A1 | 4/2013 | Oguz | |
| 2013/0127918 A1 | 5/2013 | Kang et al. | |
| 2013/0156080 A1 | 6/2013 | Cheng et al. | |
| 2013/0178248 A1 | 7/2013 | Kim | |
| 2013/0300687 A1 | 11/2013 | Park | |
| 2014/0087658 A1 | 3/2014 | Hou et al. | |
| 2014/0104160 A1 | 4/2014 | Eriksson et al. | |
| 2014/0132481 A1 | 5/2014 | Bell et al. | |
| 2014/0198036 A1 | 7/2014 | Kim et al. | |
| 2014/0240985 A1 | 8/2014 | Kim et al. | |
| 2014/0267091 A1* | 9/2014 | Kim | G06F 3/041 345/173 |
| 2014/0270303 A1 | 9/2014 | Cheng et al. | |
| 2014/0320352 A1 | 10/2014 | Hsu | |
| 2014/0353384 A1 | 12/2014 | Hoegerl et al. | |
| 2014/0354484 A1 | 12/2014 | Kashiwagi | |
| 2015/0109170 A1 | 4/2015 | Kang et al. | |
| 2015/0146069 A1 | 5/2015 | Yamazaki et al. | |
| 2015/0160699 A1 | 6/2015 | Choi et al. | |
| 2015/0173247 A1 | 6/2015 | Ueno et al. | |
| 2015/0195630 A1 | 7/2015 | Yliaho et al. | |
| 2015/0261376 A1 | 9/2015 | Kim et al. | |
| 2015/0296065 A1 | 10/2015 | Narita | |
| 2015/0366349 A1 | 12/2015 | Ross | |
| 2015/0373441 A1 | 12/2015 | Behles et al. | |
| 2016/0204499 A1 | 7/2016 | Toh | |
| 2016/0309017 A1 | 10/2016 | Lee et al. | |
| 2016/0378238 A1 | 12/2016 | Kwong | |

FOREIGN PATENT DOCUMENTS

| | | |
|---|---|---|
| CN | 101952787 | 1/2011 |
| CN | 102662302 | 9/2012 |
| CN | 103858086 | 6/2014 |
| CN | 104123030 | 10/2014 |
| CN | 104217240 | 12/2014 |
| CN | 104272526 | 1/2015 |
| CN | 104580575 | 4/2015 |
| CN | 104582379 | 4/2015 |
| CN | 1671154 | 9/2015 |
| EP | 0 911 906 | 4/1999 |
| EP | 2 065 783 | 6/2009 |
| EP | 2 448 243 | 5/2012 |
| EP | 2 894 838 | 7/2015 |
| JP | 2014-241353 | 12/2014 |
| KR | 2020120046040 | 5/2012 |
| KR | 1020130127288 | 11/2013 |
| KR | 1020140092059 | 7/2014 |
| KR | 1020150011691 | 2/2015 |
| KR | 1020150065415 | 6/2015 |
| KR | 1020150079564 | 7/2015 |
| KR | 1020150107476 | 9/2015 |
| WO | WO 2014/106691 | 7/2014 |

OTHER PUBLICATIONS

PCT/ISA/210 Search Report issued on PCT/KR2016/011131 (pp. 3).
PCT/ISA/237 Written Opinion issued on PCT/KR2016/011131 (pp. 11).
European Search Report dated Sep. 28, 2018 issued in counterpart application No. 16853878.3-1221, 16 pages.
Korean Office Action dated Nov. 23, 2022 issued in counterpart application No. 10-2015-0139898, 20 pages.

\* cited by examiner

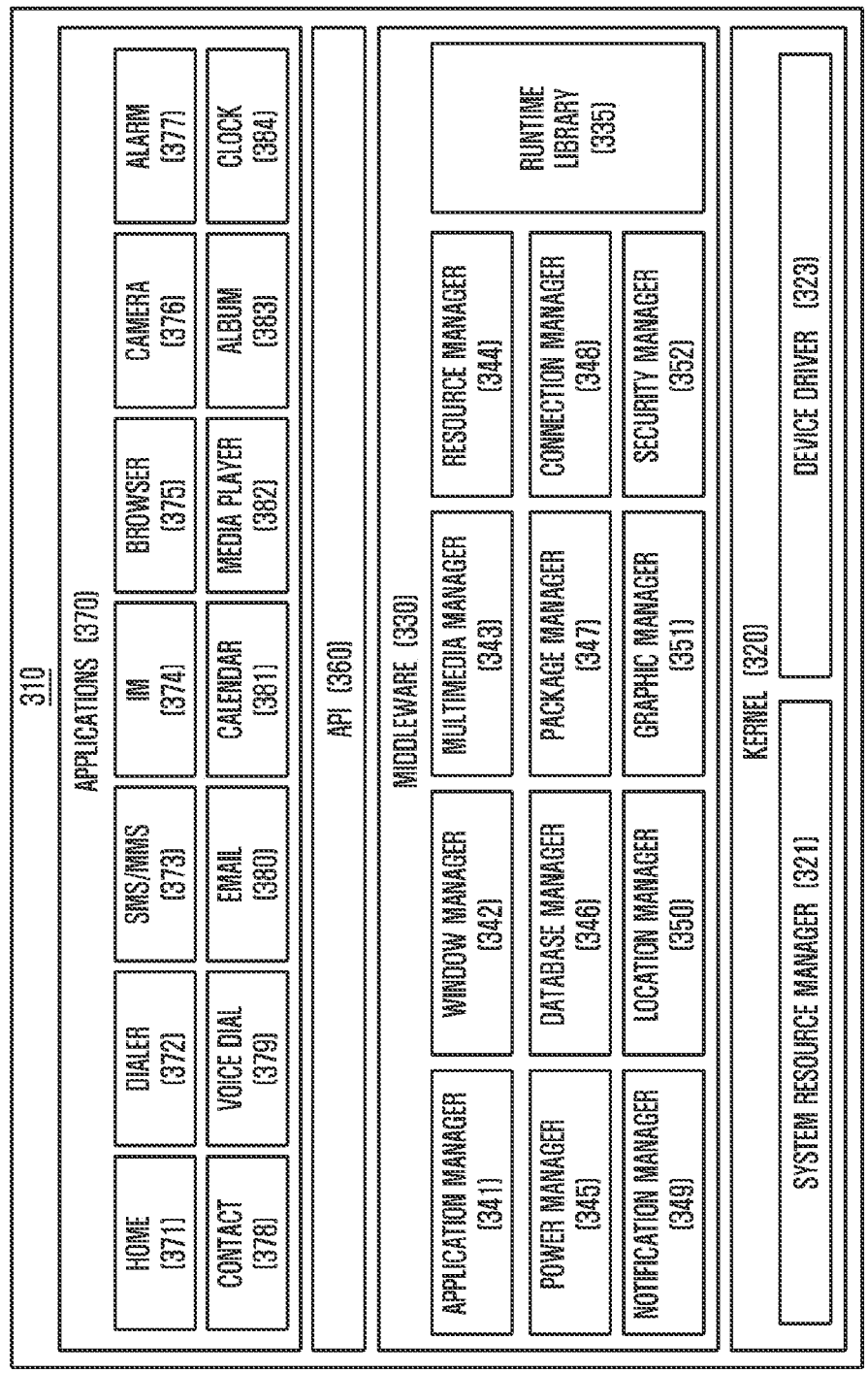

FIG. 5G
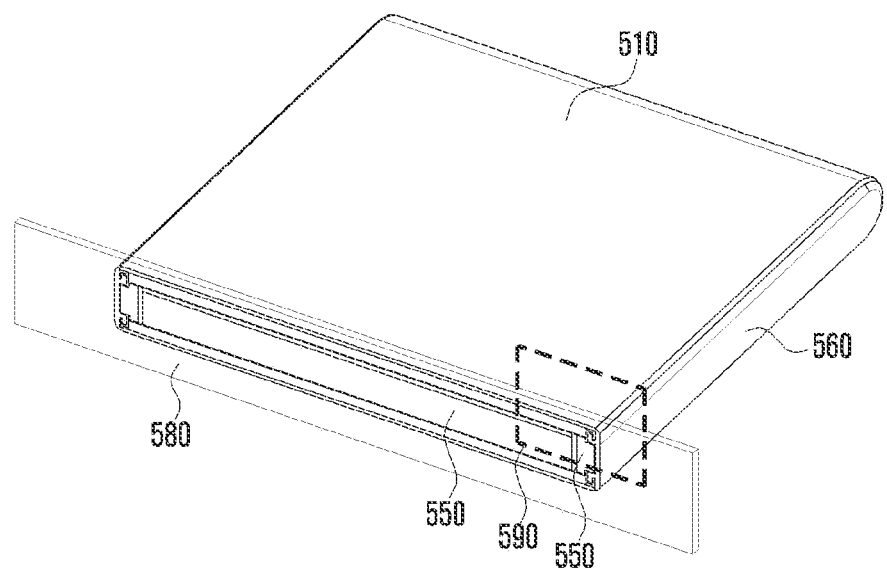
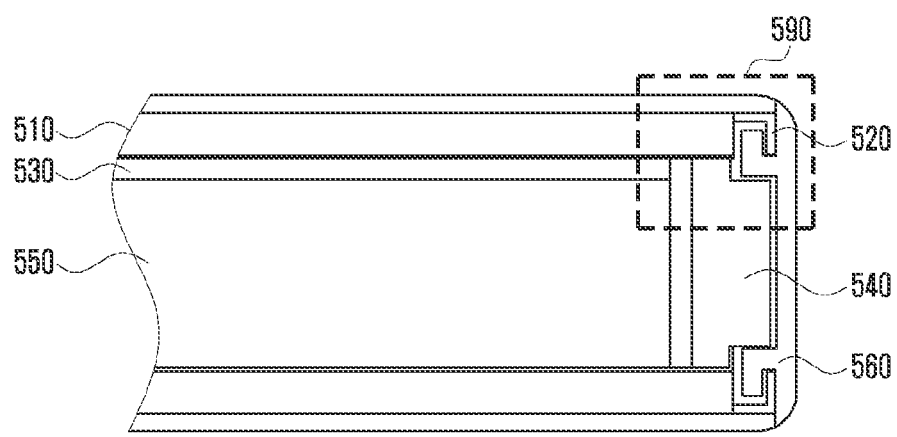

ELECTRONIC DEVICE HAVING PLURALITY OF DISPLAYS ENCLOSING MULTIPLE SIDES AND METHOD FOR CONTROLLING SAME

PRIORITY

This application is a Divisional application to U.S. application Ser. No. 15/766,274, filed in the U.S. Patent and Trademark Office on Apr. 5, 2018, which is a U.S. National Phase Entry of PCT International Application No. PCT/KR2016/011131, filed on Oct. 5, 2016, which claims priority to Korean Application No. 10-2015-0139898, which was filed on Oct. 5, 2015, the content of each of which is incorporated herein by reference.

FIELD

Various embodiments disclosed herein relate to an electronic device including a display enclosing at least two sides of the electronic device and a control method therefor.

BACKGROUND

For electronic devices, such as smartphones in particular, various technologies have been developed to provide users with widescreen displays while supporting portability. Examples are wallet-shaped, rollable, or bendable terminals with flexible displays.

In addition, electronic devices having plural displays are being developed. For example, such an electronic device may have front and rear displays or may use a slanted side as a display.

When a deformable display is applied to a mobile terminal, a larger screen can be provided regardless of the physical form of the mobile terminal, but commercialization is not easy in terms of durability and cost.

To widen the display while maintaining the rectangular shape of the mobile terminal that is a popular form today, mobile terminals have been developed that have a thin bezel, have displays on the front and back sides, or have a display extended to the sides. However, in the case of a mobile terminal having displays on the front and back sides, it is difficult to use the displays at the same time. In the case of a mobile terminal having a display extended to the side, when the user holds the mobile terminal with one hand, a touch may be input to the side display, causing malfunction.

SUMMARY

Accordingly, an aspect of the present disclosure is to provide an electronic device having plural displays that permits the user gripping the electronic device to view all the displays.

In accordance with an aspect of the present disclosure, an electronic device is provided. The electronic device includes a first surface in a first direction, a second surface in a second direction opposite to the first direction, and a third surface enclosing at least a portion of a space formed between the first surface and the second surface. The electronic device also includes an audio module changing an audio signal input to the electronic device into an electronic signal, and a processor being operationally connected to the display and the audio module. The processor is configured to detect the audio signal input via the audio module from a first user via the first surface, detect a touch signal dragged from the third surface in the direction of the second surface, and display in the second surface a translation corresponding to the audio signal.

In accordance with another aspect of the present disclosure, a method is provided for controlling an electronic device equipped with a display including a first surface in a first direction, a second surface in a second direction, and a third surface enclosing at least a portion of the space formed between the first surface and the second surface. An audio signal is detected that is input via an audio module from a first user via the first surface. A touch signal is detected that is dragged from the third surface in the direction of the second surface. A translation corresponding to the audio signal is displayed in the second surface.

In a feature of the present disclosure, an electronic device is provided having plural touchscreen displays and a control method therefor. The electronic device and control method thereof can support a plurality of working screens associated with multiple applications and can detect a user's touch gesture and display corresponding information on the multiple concatenated touchscreen displays.

In another feature of the present disclosure, when the user holds the electronic device with one hand, the user can view visual information presented through the displays on the plural sides of the electronic device without interruption. By utilizing the volume between the displays, the user can be provided with an input interface producing a sense of space such as a wheel UI. It is also possible to provide a continuous UI/UX presented across multiple sides.

BRIEF DESCRIPTION OF THE DRAWINGS

FIG. 3 is a block diagram of program modules according to various embodiments.

FIGS. 5A to 5G are exploded perspective views of the electronic device having multiple displays seen at different angles according to various embodiments.

DETAILED DESCRIPTION

Figure 1:
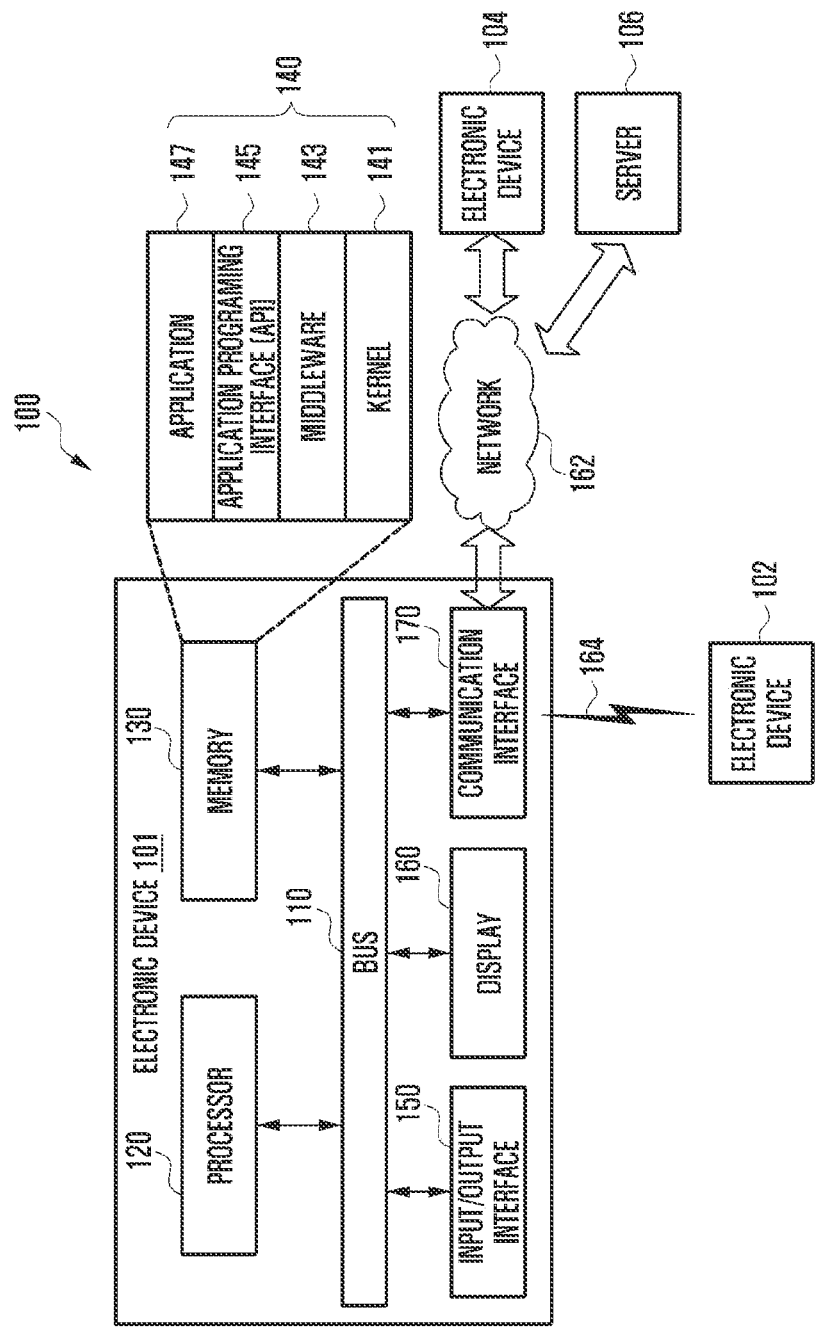
FIG. 1 illustrates a network environment including electronic devices according to various embodiments.

Hereinafter, various embodiments of the present disclosure are described with reference to the accompanying drawings. However, it should be appreciated that the present disclosure is not limited to a specific embodiment and all modifications, equivalents, and/or alternatives thereof also belong to the scope of the present disclosure. The same or similar reference symbols are used throughout the drawings to refer to the same or like parts.

In the description, an expression "have", "may have", "include" or "may include" indicates the existence of a specific feature (e.g. number, function, operation, or component like a part) and does not exclude the existence of other features.

In the description, the expression "A or B", "at least one of A and/or B", or "one or more of A and/or B" may indicate all possible combinations of A and B. For example, "A or B", "at least one of A and B", and "at least one of A or B" may indicate any of (1) including at least A, (2) including at least B, or (3) including at least A and at least B.

In various embodiments, the terms "first" and "second" may refer to various elements regardless of importance and/or order and are used to distinguish one element from another element without limitation. For example, a first user device and a second user device may indicate different user devices regardless of the order or importance of the devices. As another example, a first component may be denoted as a second component, and vice versa without departing from the scope of the present disclosure.

It will be understood that when an element (e.g., first element) is referred to as being (operatively or communicatively) "coupled with/to" or "connected with/to" another element (e.g., second element), it can be coupled or connected with/to the other element directly or via a third element. In contrast, it will be understood that when an element (e.g., first element) is referred to as being "directly coupled with/to" or "directly connected with/to" another element (e.g., second element), no other element (e.g., third element) intervenes between the element and the other element.

In the description, the phrase "configured (or set) to" may be used interchangeably with the phrase "suitable for", "having the capacity to", "designed to", "adapted to", "made to" or "capable of" depending on circumstances. The term "configured (or set) to" does not essentially mean "specifically designed in hardware to." Rather, the phrase "configured to" may mean that a device can perform a specific operation together with other devices or parts. For example, the phrase "processor configured (or set) to perform A, B, and C" may mean a dedicated processor (e.g., embedded processor) for performing the operations or a general-purpose processor (e.g., central processing unit (CPU) or application processor) that may perform the operations by executing one or more software programs stored in a memory unit.

Some terms used herein may be provided merely to describe a specific embodiment without limiting the scope of another embodiment. In the description, the singular forms "a", "an" and "the" are intended to include the plural forms as well, unless the context clearly indicates otherwise. The terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In any case, the terms defined herein should not be interpreted to exclude certain embodiments of the present disclosure.

The electronic device according to various embodiments of the present disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical instrument, a camera, and a wearable device. In various embodiments, the wearable device may include at least one of an accessory-type wearable device (e.g., watch, ring, bracelet, anklet, necklace, glasses, contact lens, or head-mounted device (HMD)), a textile/clothing-integrated wearable device (e.g., electronic clothing), a body attachment device (e.g., skin pad or tattoo), and a bio-implantable wearable device (e.g., implantable circuit).

In some embodiments, the electronic device may be a home appliance. The home appliance may include at least one of, for example, a television (TV), a digital versatile disc (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and a digital photo frame.

In other embodiments, the electronic device may include at least one of a medical device (e.g., portable medical meter (such as a blood glucose meter, a heart rate meter, a blood pressure meter, or a temperature meter), a magnetic resonance angiography (MRA) instrument, a magnetic resonance imaging (MRI) instrument, a computed tomography (CT) instrument, a medical scanner, or an ultrasonic device), a navigation equipment, a global navigation satellite system (GNSS), an event data recorder (EDR), a flight data recorder (FDR), an automotive infotainment device, a marine electronic equipment (e.g., a marine navigation device, and a gyro compass or the like), avionics, a security device, a car head unit, an industrial or home robot, an automatic teller machine (ATM) for banks, a point-of-sale (POS) system for shops, and an internet of things (IoT) device (e.g., an electronic bulb, a sensor, an electricity or gas meter, a sprinkler device, a fire alarm, a thermostat, a streetlamp, a toaster, fitness equipment, a hot-water tank, a heater, or a boiler).

In one embodiment, the electronic device may include at least one of a part of furniture or a building/structure, an electronic board, an electronic signature receiving device, a projector, or a measurement meter (e.g., a water meter, an electricity meter, a gas meter, or a radio wave meter). In various embodiments, the electronic device may be one or a combination of the above-described devices. In one embodiment, the electronic device may be a flexible electronic device. The electronic device according to an embodiment of the present disclosure is not limited to the above-described devices, and it may include a new electronic device to be developed as technology advances.

Next, a description is given of an electronic device according to various embodiments with reference to the accompanying drawings. In the description, the term "user" may refer to a person who uses the electronic device, or a device that uses the electronic device (e.g., artificial intelligence electronic device).

With reference to FIG. 1, a description is given of the electronic device 101 in a network environment 100. The electronic device 101 may include a bus 110, a processor 120, a memory 130, an input/output interface 150, a display 160, and a communication interface 170. In certain embodiments, at least one of the existing components may be omitted from the electronic device 101, or a new component may be added to the electronic device 101.

The bus 110 may include, for example, circuits that connect the components 110 to 170 to each other and transfer communication signals (e.g., control message and/ or data) between the components 110 to 170.

The processor 120 may include one or more of a central processing unit (CPU), an application processor (AP), and a communication processor (CP). The processor 120 may control at least one component of the electronic device 101 and perform communication-related or data processing operations for the other components.

The memory 130 may include a volatile and/or nonvolatile memory. The memory 130 may store, for example, a command or data related to at least one component of the electronic device 101. In one embodiment, the memory 130 may store software and/or programs 140. The programs 140 may include, for example, a kernel 141, a middleware 143, an application programming interface (API) 145, and/or an application program (or application) 147. At least some of the kernel 141, the middleware 143 or the API 145 may be referred to as an operating system (OS).

The kernel 141 may control or manage the system resources (e.g., bus 110, processor 120, or memory 130) that are used to execute operations or functions implemented in other programs (e.g., middleware 143, API 145, or application program 147). Further, the kernel 141 may provide an interface that enables the middleware 143, the API 145 or the application program 147 to control or manage the system resources by accessing the individual components of the electronic device 101.

The middleware 143 may perform an intermediary role so that, for example, the API 145 or the application program 147 may exchange data with the kernel 141.

Further, the middleware 143 may schedule one or more work requests from the application programs 147 according to their priorities. For example, the middleware 143 may assign priorities to the application programs 147 for utilizing the system resources (e.g., bus 110, processor 120, or memory 130) of the electronic device 101. The middleware 143 may perform scheduling or load balancing for one or more work requests by processing them according to their priorities.

The API 145 is, for example, an interface that enables the applications 147 to control functions provided by the kernel 141 or the middleware 143 and may include at least one interface or function (e.g., command) for, for example, file control, window control, image processing, or character control.

The input/output interface 150 may serve as an interface that can receive a command or data from, for example, the user or other external device and forward the same to the other components of the electronic device 101. Further, the input/output interface 150 may output a command or data received from the other components of the electronic device 101 to the user or other external device.

The display 160 may include, for example, a liquid crystal display (LCD), a light emitting diode (LED) display, an organic LED (OLED) display, a micro-electromechanical systems (MEMS) display, or an electronic paper display. The display 160 may display a variety of content (e.g., text, image, video, icon, or symbol) for the user. The display 160 may include a touchscreen and may receive a touch input, a gesture input, a proximity input, or a hovering input through, for example, an electronic pen or a body portion of the user.

The communication interface 170 may establish communication between the electronic device 101 and an external device (e.g., first external electronic device 102, second external electronic device 104, or server 106). For example, the communication interface 170 may connect to the network 162 through wireless communication or wired communication to communicate with an external device (e.g., second external electronic device 104 or server 106).

Wireless communication may utilize at least one of, for example, long term evolution (LTE), LTE-advanced (LTE-A), code division multiple access (CDMA), wideband code division multiple access (WCDMA), universal mobile telecommunication system (UMTS), wireless broadband (WiBro), and global system for mobile communication (GSM), as a cellular communication protocol. Further, wireless communication may use, for example, short-range communication. Short-range communication may include at least one of, for example, wireless fidelity (Wi-Fi), Bluetooth, near field communication (NFC), and the global navigation satellite system (GNSS). The GNSS may include at least one of, for example, the global positioning system (GPS), the global navigation satellite system (Glonass), the Beidou navigation satellite system (Beidou), Galileo, and the European global satellite-based navigation system, depending on the usage area or the bandwidth. Herein, the term "GPS" may be used interchangeably with the term "GNSS". Wired communication may use at least one of, for example, Universal Serial Bus (USB), High Definition Multimedia Interface (HDMI), Recommended Standard 232 (RS-232), and Plain Old Telephone Service (POTS). The network 162 may be a telecommunications network, such as a computer network (e.g., local area network (LAN) or wide area network (WAN)), the Internet, or a telephone network.

The first external electronic device 102 and the second external electronic device 104 may be of a type identical to or different from that of the electronic device 101. In one embodiment, the server 106 may be a group of one or more servers. In various embodiments, all or some of the operations executed in the electronic device 101 may be executed in one or more other electronic devices (e.g., electronic devices 102 and 104 or server 106). In one embodiment, to perform a certain function or service automatically or upon request, the electronic device 101 may, instead of or in addition to executing the function or service, request external electronic devices (e.g., electronic device 102 or 104, or server 106) to execute at least some of the function. The external electronic devices (e.g., electronic device 102 or 104, or server 106) may execute the requested function or an additional function, and return the results to the electronic device 101. The electronic device 101 may further process the received results if necessary and provide the requested function or service. To this end, technologies such as cloud computing, distributed computing, and client-server computing may be used.

Figure 2:
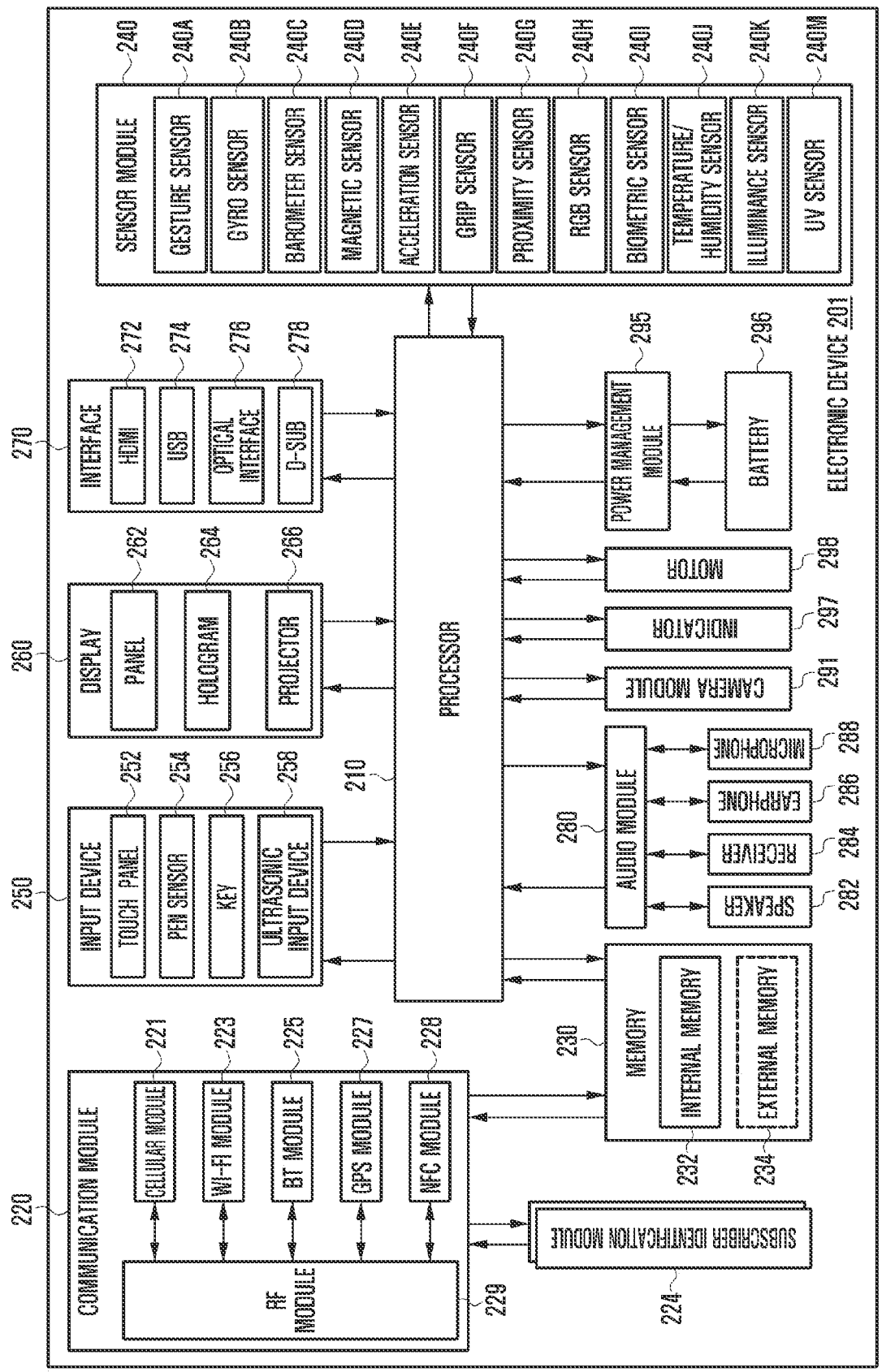
FIG. 2 is a block diagram of an electronic device according to various embodiments.

FIG. 2 is a block diagram of an electronic device 201 according to various embodiments. The electronic device 201 may include all or some of the elements of, for example, the electronic device 101 shown in FIG. 1. The electronic device 201 may include at least one processor 210 (e.g., application processor), a communication module 220, a subscriber identification module 224, a memory 230, a sensor module 240, an input unit 250, a display 260, an interface 270, an audio module 280, a camera module 291, a power management module 295, a battery 296, an indicator 297, and a motor 298.

The processor 210 may control a plurality of hardware or software components connected thereto, process various pieces of data, and perform calculations by executing, for example, the operating system or application programs. The processor 210 may be implemented as, for example, a system on chip (SoC). In one embodiment, the processor 210 may further include a graphics processing unit (GPU) and/or an image signal processor. The processor 210 may include at least some (e.g., cellular module 221) of the elements illustrated in FIG. 2. The processor 210 may load instructions or data received from at least one component (e.g., non-volatile memory) onto the volatile memory for execution and may store various data in the non-volatile memory.

The communication module 220 may have a configuration identical or similar to that of the communication interface 170 of FIG. 1. The communication module 220 may include, for example, a cellular module 221, a Wi-Fi module 223, a Bluetooth module 225, a GNSS module 227 (e.g., GPS module, Glonass module, Beidou module, or Galileo module), an NFC module 228, and a radio frequency (RF) module 229.

The cellular module 221 may provide a voice call service, a video call service, a text message service, or an Internet service through, for example, a communication network. In one embodiment, the cellular module 221 may identify and authenticate the electronic device 201 within the communication network by use of the subscriber identification module 224 (e.g., SIM card). In one embodiment, the cellular module 221 may perform at least some of the functions provided by the processor 210. In one embodiment, the cellular module 221 may include a communication processor (CP).

The Wi-Fi module 223, the Bluetooth module 225, the GNSS module 227, and the NFC module 228 may each include a processor to process data transmitted and received through the corresponding module. In one embodiment, at least some (e.g., two or more) of the cellular module 221, the Wi-Fi module 223, the Bluetooth module 225, the GNSS module 227, and the NFC module 228 may be included in one integrated chip (IC) or IC package.

The RF module 229 may transmit and receive a communication signal (e.g., RF signal). The RF module 229 may include a transceiver, a power amp module (PAM), a frequency filter, a low noise amplifier (LNA), an antenna, and the like. In another embodiment, at least one of the cellular module 221, the Wi-Fi module 223, the Bluetooth module 225, the GNSS module 227, and the NFC module 228 may transmit and receive an RF signal through a separate RF module.

The subscriber identification module 224 may include a SIM card and/or an embedded SIM and may store unique identification information (e.g., integrated circuit card identifier (ICCID)) or subscriber information (e.g., international mobile subscriber identity (IMSI)).

The memory 230 (e.g., memory 130) may include, for example, an internal memory 232 and an external memory 234. The internal memory 232 may include at least one of a volatile memory (e.g., dynamic random access memory (DRAM), static RAM (SRAM), or synchronous DRAM (SDRAM)), a non-volatile memory (e.g., one-time programmable read only memory (OTPROM), programmable ROM (PROM), erasable and programmable ROM (EPROM), electrically erasable and programmable ROM (EEPROM), mask ROM, flash ROM, or flash memory such as NAND flash or NOR flash), a hard disk drive, and a solid state drive (SSD).

The external memory 234 may include a flash drive such as compact flash (CF), secure digital (SD), micro-SD, mini-SD, extreme digital (xD), or multi-media card (MMC) and may further include a memory stick or the like. The external memory 234 may be functionally and/or physically connected to the electronic device 201 through various interfaces.

The sensor module 240 may measure a physical quantity or sense the operation state of the electronic device 201 and convert the measured or sensed result into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control one or more sensors included therein. In one embodiment, the electronic device 201 may further include a processor configured to control the sensor module 240 as a part of the processor 210 or a separate entity, and the processor may control the sensor module 240 while the processor 210 is in the sleep state.

The input unit 250 may include, for example, a touch panel 252, a (digital) pen sensor 254, a key 256, and an ultrasonic input tool 258. The touch panel 252 may use at least one of, for example, a capacitive technique, a resistive technique, an infrared technique, and an ultrasonic technique. The touch panel 252 may further include a control circuit. The touch panel 252 may further include a tactile layer to provide a tactile response to the user.

The (digital) pen sensor 254 may include a recognition sheet as a part of the touch panel or a separate entity. The key 256 may include, for example, a physical button, an optical key, or a keypad. The ultrasonic input tool 258 may identify data corresponding to an ultrasonic wave that is generated by an input means and sensed by a microphone (e.g., microphone 288).

The display 260 (e.g., display 160) may include a panel 262, a hologram unit 264, and a projector 266. The panel 262 may have a configuration identical or similar to that of the display 160 of FIG. 1. The panel 262 may be implemented to be, for example, flexible, transparent, or wearable. The panel 262 and the touch panel 252 may be implemented as a single module. The hologram unit 264 may present three dimensional images in the air by using interference of light. The projector 266 may display an image by projecting light onto a screen. The screen may be located inside or outside the electronic device 201. In one embodiment, the display 260 may further include a control circuit to control the panel 262, the hologram unit 264, or the projector 266.

The interface 270 may include, for example, a high definition multimedia interface (HDMI) 272, a universal serial bus (USB) 274, an optical interface 276, and a D-subminiature (D-sub) 278. The interface 270 may be included in, for example, the communication interface 170 of FIG. 1. The interface 270 may additionally or alternatively include a mobile high-definition link (MHL) interface, a secure digital (SD) card/multimedia card (MMC) interface, or an infrared data association (IrDA) standard interface.

The audio module 280 may convert a sound into an electrical signal or vice versa, for example. At least a part of the audio module 280 may be included in, e.g., the input/output interface 150 of FIG. 1. The audio module 280 may process input or output sound information through, for example, the speaker 282, receiver 284, earphone 286, or microphone 288.

The camera module 291 may be used to capture, for example, still and moving images. In one embodiment, the camera module 291 may include one or more image sensors (e.g., front and back sensors), a lens, an image signal processor (ISP), and a flash (e.g., LED or xenon lamp).

The power management module 295 may manage power of the electronic device 201. In one embodiment, the power management module 295 may include a power management integrated circuit (PMIC), a charger IC, and a battery or fuel gauge. The PMIC may use wired and/or wireless charging. Wireless charging may employ, for example, a magnetic resonance scheme, a magnetic induction scheme, or an electromagnetic wave based scheme and may further employ a supplementary circuit for wireless charging, such as a coil loop, a resonance circuit, or a rectifier. The battery gauge may measure, e.g., the remaining power, voltage, current, or temperature of the battery 296 while the battery 296 is being charged. The battery 296 may include, for example, a rechargeable battery and/or a solar battery.

The indicator 297 may indicate a specific state of the electronic device 201 or a part thereof (e.g., processor 210), such as a booting state, message state, or charging state. The motor 298 may convert an electrical signal to a mechanical vibration to generate vibrations or haptic effects. Although not shown, the electronic device 201 may include a processor for supporting mobile TV (e.g., GPU). The processor for mobile TV may process media data conforming to the standard such as digital multimedia broadcasting (DMB), digital video broadcasting (DVB), or MediaFlo™.

Each component of the electronic device described above may be composed of one or more elements, and component names may be varied according to the type of the electronic device. In various embodiments, the electronic device may be configured to include at least one of the aforementioned components, and an existing component may be omitted and a new component may be added. In various embodiments, some of the components of the electronic device may be combined into one entity while maintaining the same functionality.

FIG. 3 is a block diagram of program modules according to various embodiments. In one embodiment, the program modules 310 (e.g., programs 140) may include an operating system (OS) for controlling resources related to the electronic device (e.g., electronic device 101) and/or various applications (e.g., application programs 147) running on the operating system. The operating system may be, for example, Android, iOS, Windows, Symbian, Tizen, or Bada.

The program modules 310 may be composed of a kernel 320, middleware 330, an application programming interface (API) 360, and/or applications 370. At least some of the program modules 310 may be preloaded on the electronic device or may be downloaded from an external electronic device (e.g., electronic device 102 or 104, or server 106).

The kernel 320 (e.g., kernel 141) may include, for example, a system resource manager 321 and/or a device driver 323. The system resource manager 321 may control, allocate, or reclaim system resources. In one embodiment, the system resource manager 321 may include a process manager, a memory manager, and a file system manager. The device driver 323 may include, for example, a display driver, a camera driver, a Bluetooth driver, a shared memory driver, a USB driver, a keypad driver, a Wi-Fi driver, an audio driver, and an inter-process communication (IPC) driver.

The middleware 330 may provide functions commonly needed by the applications 370 or may provide various functions to the applications 370 through the API 360 so that the applications 370 can efficiently use limited system resources in the electronic device. In one embodiment, the middleware 330 (e.g., middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include library modules that can be used by a compiler to add a new function through a programming language during application execution. The runtime library 335 may perform functions for input/output management, memory management, or arithmetic operations.

The application manager 341 may manage the life cycle of at least one application among the applications 370. The window manager 342 may manage GUI resources used for the screen. The multimedia manager 343 may identify the format of a media file to be played back and perform encoding and decoding of the media file using a codec matching the identified format. The resource manager 344 may manage resources, such as source code, memory space, and storage space, needed by at least one of the applications 370.

The power manager 345 may operate in cooperation with, for example, the basic input/output system (BIOS) to manage the power source such as the battery and provide power information needed for operation of the electronic device. The database manager 346 may permit at least one of the applications 370 to create, search, and update a database. The package manager 347 may manage installation and update of an application distributed in a package file format.

The connectivity manager 348 may manage wireless links based on, for example, Wi-Fi or Bluetooth. The notification manager 349 may notify the user of events such as message reception, appointment arrival, and proximity in a non-disruptive manner. The location manager 350 may manage location information of the electronic device. The graphics manager 351 may manage graphical effects and related user interfaces for the user. The security manager 352 may provide various security functions needed for system security or user authentication. In one embodiment, when the electronic device (e.g., electronic device 101) supports a telephony function, the middleware 330 may further include a telephony manager to manage voice or video call functions of the electronic device.

The middleware 330 may include a middleware module to form a combination of various functions of the above-described components. To provide differentiated functions, the middleware 330 may provide modules adapted to the types of operating systems. The middleware 330 may delete an existing component or add a new component in a dynamic manner.

The API 360 (e.g., API 145) is a set of API functions for programming and may be configured differently according to the operating system. For example, Android and iOS may provide one API set for each platform, and Tizen may provide two or more API sets for each platform.

The applications 370 (e.g., application programs 147) may include, for example, a home 371, a dialer 372, an SMS/MMS application 373, an instant messenger (IM) 374, a browser 375, a camera application 376, an alarm 377, contacts 378, a voice dialer 379, an email application 380, a calendar application 381, a media player 382, an album application 383, and a clock application 384; and they may further include, for example, a health-care application (e.g., measuring the workout quantity or blood sugar) and an environmental information application (e.g., providing information on the atmospheric pressure, humidity, or temperature).

In one embodiment, the applications 370 may include an application supporting information exchange between the electronic device (e.g., electronic device 101) and an external electronic device (e.g., electronic device 102 or 104) (referred to as "information exchange application" for ease of description). The information exchange application may include, for example, a notification relay application for sending specific information to an external electronic device and a device management application for managing external electronic devices.

For example, the notification relay application may have a function for delivering notification information generated from other applications (e.g., SMS/MMS application, email application, health-care application, or environmental information application) to an external electronic device (e.g., electronic device 102 or 104). The notification relay application may also receive notification information from an external electronic device and deliver the same to the user.

The device management application may manage at least one function (e.g., device or component turn-on/off, display brightness or resolution adjustment) of an external electronic device (e.g., electronic device 102 or 104) communicating with the electronic device, manage (e.g., install, uninstall, or update) an application running on the external electronic device, or manage a service (e.g., call or message service) provided by the external electronic device.

In one embodiment, the applications 370 may include an application designated according to an attribute (e.g., health-care application of a mobile medical appliance) of an external electronic device (e.g., electronic device 102 or 104). In one embodiment, the applications 370 may include an application received from an external electronic device (e.g., server 106, electronic device 102 or 104). In one embodiment, the applications 370 may include a preloaded application or a third party application downloadable from a server. Component names of the program modules 310 may be varied according to the type of operating system.

In various embodiments, at least some of the program modules 310 may be implemented in software, firmware, hardware, or a combination thereof. At least some of the program modules 310 may be implemented (e.g., executed) by a processor (e.g., processor 210). At least some of the program modules 310 may include, for example, a module, a program, a routine, a set of instructions, or a process supporting one or more functions.

In the present document, the term "module" may refer to a certain unit that includes one of hardware, software, or firmware or any combination thereof. The term "module" may be used interchangeably with the term "unit", "logic", "logical block", "component", or "circuit", for example. The module may be the minimum unit of a single-bodied component or a part thereof. The module may be the minimum unit, or a part thereof, that performs one or more particular functions. The module may be realized mechanically or electronically. For example, the module may include at least one of an ASIC (application-specific integrated circuit) chip, FPGA (field-programmable gate array), and PLD (programmable-logic device), which are known or are to be developed in the future.

At least a part of the device (e.g., modules or functions) or the method (e.g., operations) according to various embodiments may be implemented as instructions in the form of a program module, which can be stored in a computer readable storage medium. When the instructions are executed by a processor (e.g., processor 120), the processor may carry out functions corresponding to the instructions. For example, the memory 130 may be a computer readable storage media.

The computer readable storage media may include magnetic media such as a hard disk, floppy disk and magnetic tape, optical media such as a CD-ROM and DVD, magneto-optical media such as a floptical disk, and memory devices such as a ROM, RAM, and flash memory. The program instructions may include machine codes produced by compilers and high-level language codes executable through interpreters. The above-described hardware device may be configured to operate as one or more software modules so as to perform operations of various embodiments, and vice versa.

A module or program module in various embodiments may include at least one of the components described above. An existing component of the module may be removed or a new component may be added to the module. Operations supported by a module, program module, or another component may be carried out in sequence, in parallel, by repetition, or heuristically. Some operations may be executed in a different order or may be omitted, and a new operation may be added. In addition, the disclosed embodiments are provided for explanation and understanding of technical details and are not intended to limit the scope of the present disclosure. Accordingly, the scope of the present disclosure should be construed as including all modifications and other embodiments based on the subject matter of the present disclosure.

FIGS. 4A to 4E depict multiple displays and antennas mounted in the displays according to various embodiments.

Figure 4A:
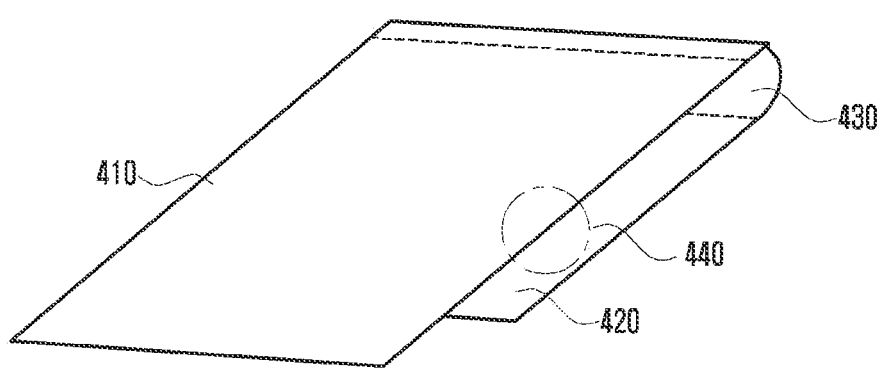
FIGS. 4A to 4E depict multiple displays and antennas mounted in the displays according to various embodiments.

FIG. 4A illustrates the display of the electronic device in various embodiments. A single display panel may be processed into a display having multiple planes applicable to the electronic device disclosed herein.

In one embodiment, the display may be configured to include a first display area 410 in a first direction, a second display area 420 in a second direction opposite to the first direction, and a third display area 430 enclosing at least a portion of the space formed between the first display area 410 and the second display area 420. The display may be seen, for example, as a "U" shape or a "⊏" shape (Korean consonant) depending on the curvature of the third display area 430. That is, the third display area 430 may have a curved shape or a planar shape.

The first display area 410 and the second display area 420 may be configured to be parallel to each other, or not to be parallel within a range that they do not contact each other in another embodiment. The configuration of the display may be determined according to the shape of the outer housing of the electronic device.

Figure 4B:
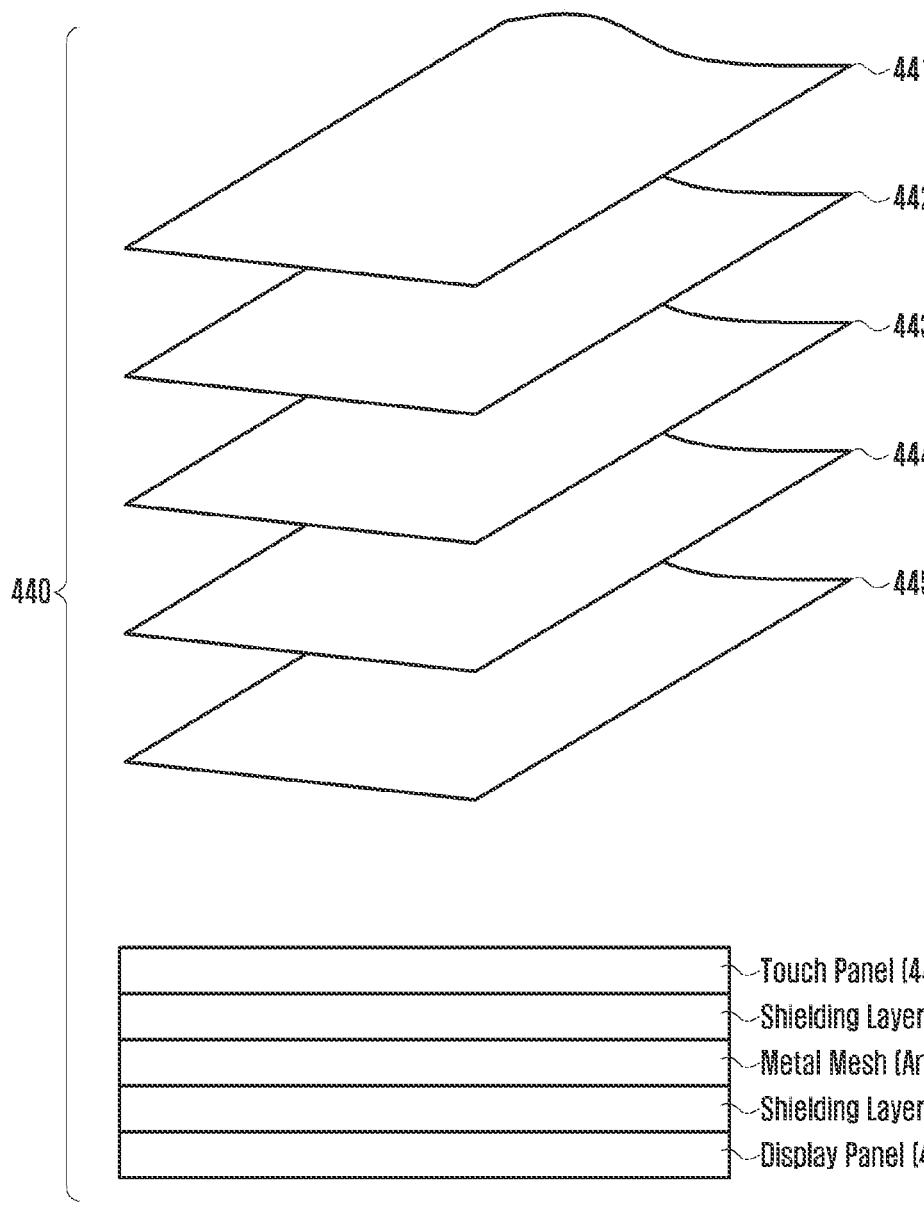

FIG. 4B is a detailed view of the cross section 440 of the display. The display of the electronic device disclosed herein may be composed of a touch panel 441 for sensing touch input, shielding layers 442 and 444 serving as a ground, a metal mesh structure 443 serving as an antenna, and a display panel 445.

In one embodiment, in the display, at least one shielding layer 444 may be stacked on the display panel 445, a metal mesh antenna 443 may be placed on the shielding layer 444, at least one shielding layer 442 may be stacked on the antenna, and the display panel 445 may be placed on the shielding layer 442. The above stacking order is an example, and the stacking order may be varied according to an addition of a component or the shape of the antenna.

The shielding layers 442 and 444 can reduce jamming that may occur when the user touches the electronic device, and they can reduce the noise due to interference between the touch panel or display panel and the antenna.

The antenna may have a structure other than a metal mesh in its shape. For example, the antenna may have a radiation pattern including at least one open boundary and plural radiating portions arranged across the open boundary. The shape of the antenna can be configured to minimize noise by varying the spiral or stacking forms.

Figure 4C:
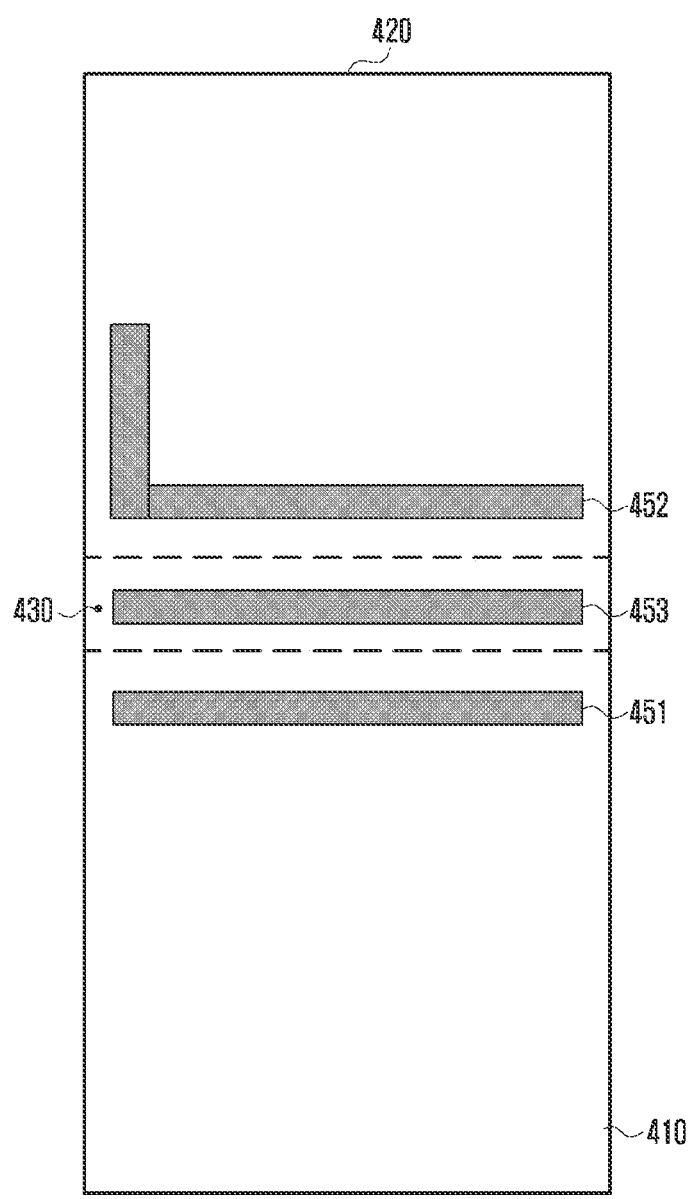

FIG. 4C shows an embodiment where at least one antenna may be included in each of the first to third display areas. A first antenna 451 may be disposed in the first display area 410, a second antenna 452 may be disposed in the second display area 420, and a third antenna 453 may be disposed in the third display area 430. The first to third antennas can operate independently of each other. The operation of each antenna can be determined according to the form in which the user grips the electronic device or the strength of a radio signal transmitted from the base station.

Figure 4D:
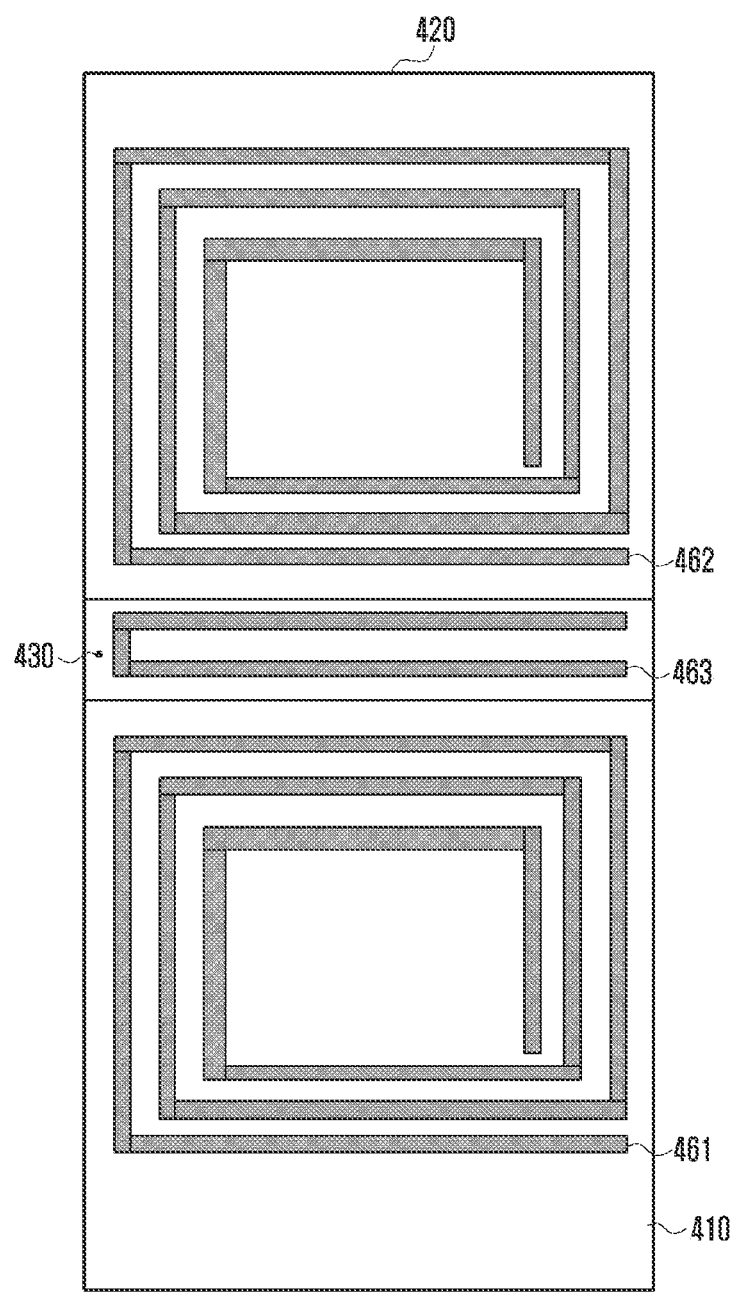

FIG. 4D illustrates various forms that the first to third antennas 461 to 463 can take. The first to third display areas 410 to 430 may have different shapes and sizes because their shapes and sizes are determined according to the shape of the outer housing. Various types of antennas can be disposed inside different display areas. The first antenna and the second antenna disposed respectively in the first display area 410 and the second display area 420 facing each other may be configured to face each other in consideration of interference therebetween.

The antenna may be configured to have a stick shape as indicated by indicia 451, or a spiral shape as indicated by indicia 461. The shape of the antenna may be modified in various ways by a person skilled in the art.

Figure 4E:
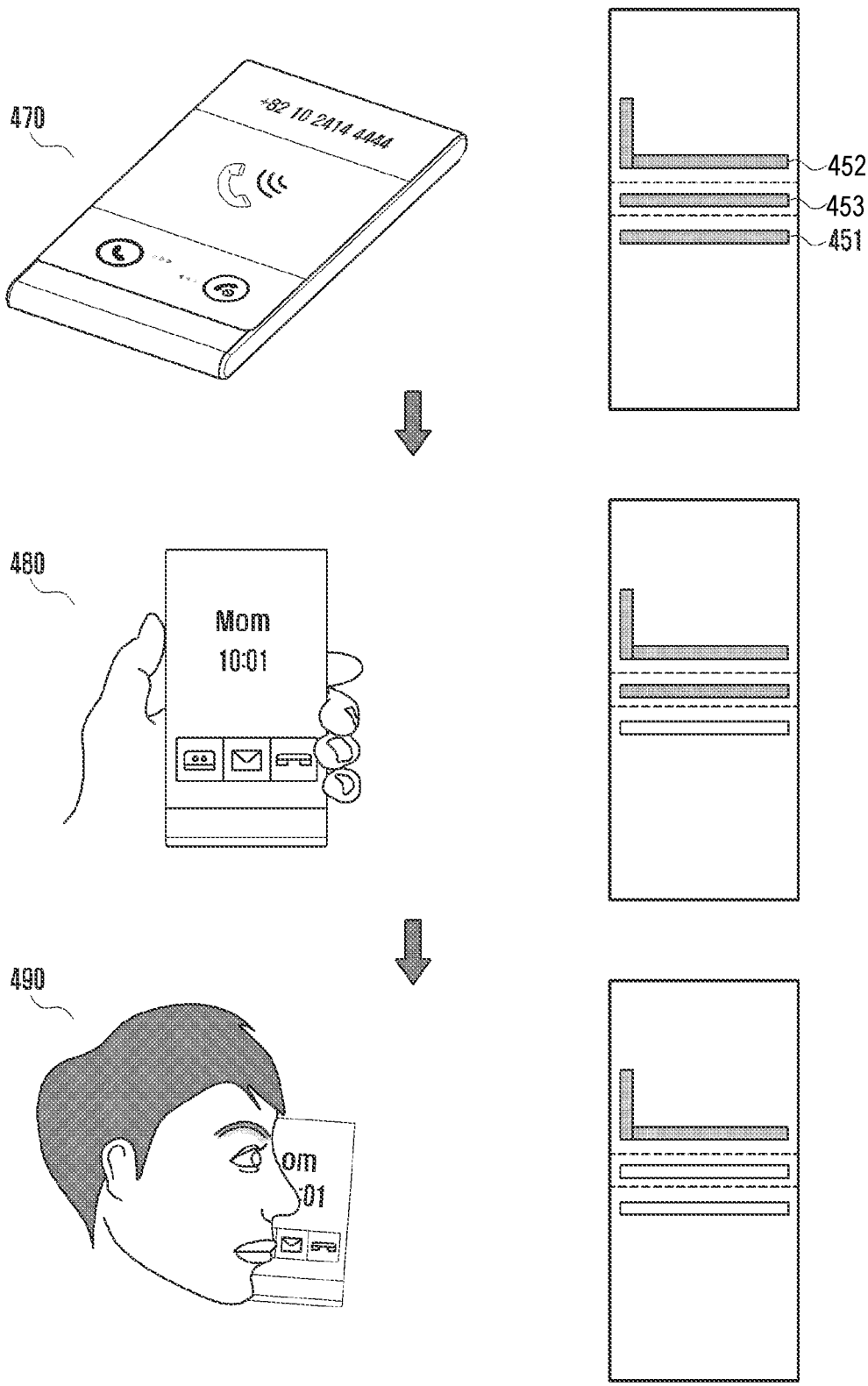

FIG. 4E illustrates activation of different antennas according to the usage pattern of the user. When a call is received while the electronic device is placed on the floor, all the first to third antennas 451 to 453 may be activated to receive signals from the base station. In this case, as indicated by indicia 470, since there is no nearby object that can cause noise (e.g., a user's hand), the electronic device can receive signals using all the antennas without interference.

As indicated by indicia 480, when the user grips the electronic device in the hand, noise may occur owing to the user's hand. If interference is strong when a signal is received using a specific antenna as a result of noise caused by a nearby object, the electronic device may deactivate that antenna and receive a signal using the remaining antennas.

As indicated by indicia 490, when the user brings the electronic device to the face for the call, radio interference can occur because of the contact between the electronic device and a portion of the face. In this case, the electronic device may receive a radio signal using only the third antenna 453 which is disposed at a relatively outer portion and it is less influenced by any noise.

The electronic device may select one or more of the antennas to be activated according to an external condition such as the behavior of the user using the electronic device or the place where the signal is being received, thereby reducing power consumption and improving call quality.

FIGS. 5A to 5G are exploded perspective views of the electronic device having multiple displays seen at different angles according to various embodiments.

Figure 5A:
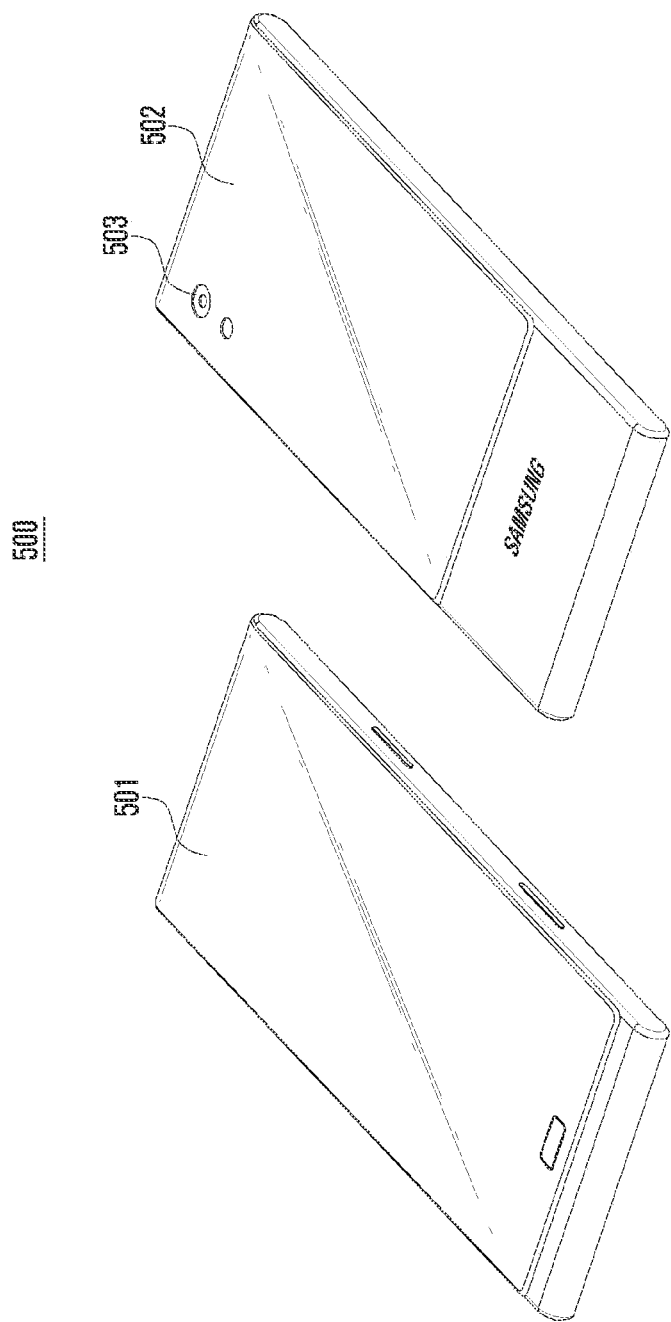

FIG. 5A shows perspective views of the front and the rear of the electronic device body in various embodiments. The electronic device 500 is a portable electronic device whose one display (510 in FIG. 5B) encloses more than one side of the housing (570 in FIG. 5D) constituting the electronic device 500. Here, the display 510 is configured to pass over the upper portion of the electronic device 500.

Generally, the front display 501 may be extended up to the rear side 502 while enclosing the upper portion of the electronic device. Alternatively, the two displays mounted on the front and rear sides may be coupled in the vicinity of the upper portion of the electronic device.

A home button in the form of a physical or virtual button may be provided on the front side 501 of the electronic device 500, and a camera 503 may be provided on the rear side 502. The rear display 502 may be configured smaller than the front display 501. A speaker (not shown) or a camera 503 may be disposed at a portion formed on the rear display 502 being configured smaller than the front display 501.

Here, the front side refers to the side or face on which the main display mostly used by the user is located, and it may be the side or face on which a physical button such as the home button is usually located. In one embodiment, the front side and the rear side may be distinguished according to, but not limited to, the presence of a physical button or the location where the camera is mounted.

In the embodiments shown in the drawings, the side on which the camera is not exposed is the front side. However, the front side may be not limited thereto in other embodiments.

Figure 5B:
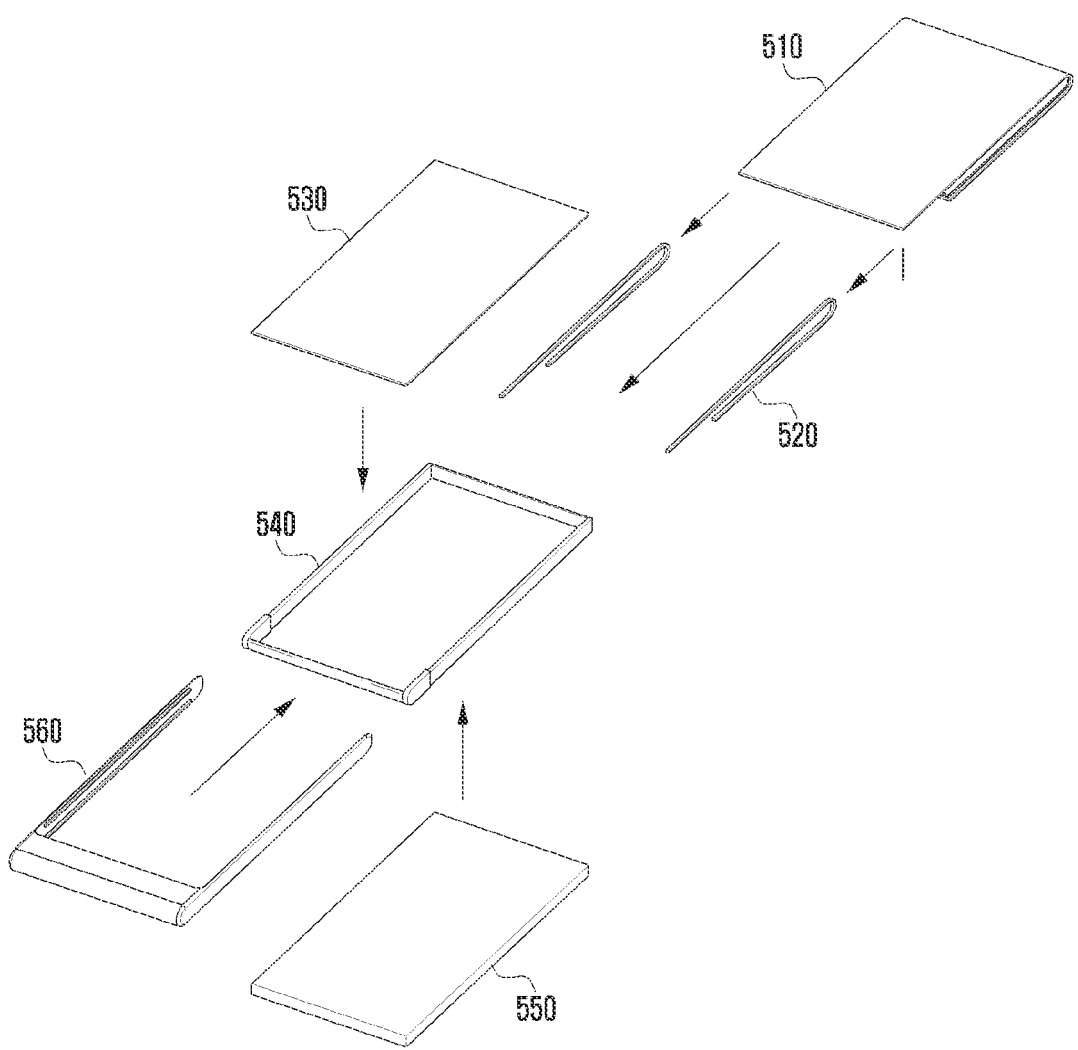

FIG. 5B is an assembly diagram of the electronic device 500. In one embodiment, the electronic device 500 may include a display 510, a fastening member 520, a circuit unit 530, a bracket 540, a power supply unit 550 (battery), and an outer housing 560.

The display 510 may be made of one display panel including a touch panel, and the display panel including a touch panel may be configured in a curved shape.

In one embodiment, the display 510 may be configured to include a first surface in a first direction, a second surface in a second direction opposite to the first direction, and a third surface enclosing at least a portion of the space formed between the first surface and the second surface.

As one area of the display 510 has a curved shape, one side and the other side of the display 510 may be configured to face each other at a given interval.

As described above, since the display 510 has the two sides configured to face each other at a given interval, it can directly represent three planes. For example, the display 510 may be configured in a curved "U"-shape. The circuit unit 530 may be a printed circuit board (PCB) connected to the display.

The power supply unit 550 may include at least one battery (not shown), a power supply circuit, and a battery charging circuit, disposed in the housing of the electronic device 500 under the control of the controller. The power supply unit 550 can supply power to the electronic device 500. The power supply unit 550 may draw power from an external power source (not shown) and supply it to the components or battery of the electronic device 500 through a cable connected to the connector. The power supply unit 550 may draw power from an external power source and supply it to the components or battery of the electronic device 500 through wireless charging.

The power supply unit 550 and the circuit unit 530 may be coupled in a face-to-face manner. One surface of the circuit unit 530 and one surface of the power supply unit 550 may be electrically connected, or the protruding portions of the circuit unit 530 and the power supply unit 550 may be electrically connected to each other by connection lines.

The assembly of the circuit unit 530 and the power supply unit 550 may be fixed by the bracket 540 having an opening at its center so as to enclose the assembly. The bracket 540 is a frame-shaped member for supporting the components mounted inside the electronic device. The bracket 540 may have a rectangular ring shape with an empty center.

The outer housing 560 may have a structure that provides a space in which the bracket 540 containing the components of the electronic device can be mounted and can be combined with the display 510 having three planes. In one embodiment, to mount the bracket 540 inside the outer housing 560, the outer housing 560 may have a left elongated portion parallel to a first side of the bracket 540, a right elongated portion parallel to a second side facing the first side of the bracket 540, and a reference portion coupled to a third side of the bracket 540 other than the first side and the second side while interconnecting the left and right elongated portions.

The fastening member 520 can be used to couple the display 510 and the outer housing 560 together. The fastening member 520 may be configured as a rail type so that the display 510 and the outer housing 560 can be easily coupled or separated in a sliding way.

Figure 5C:
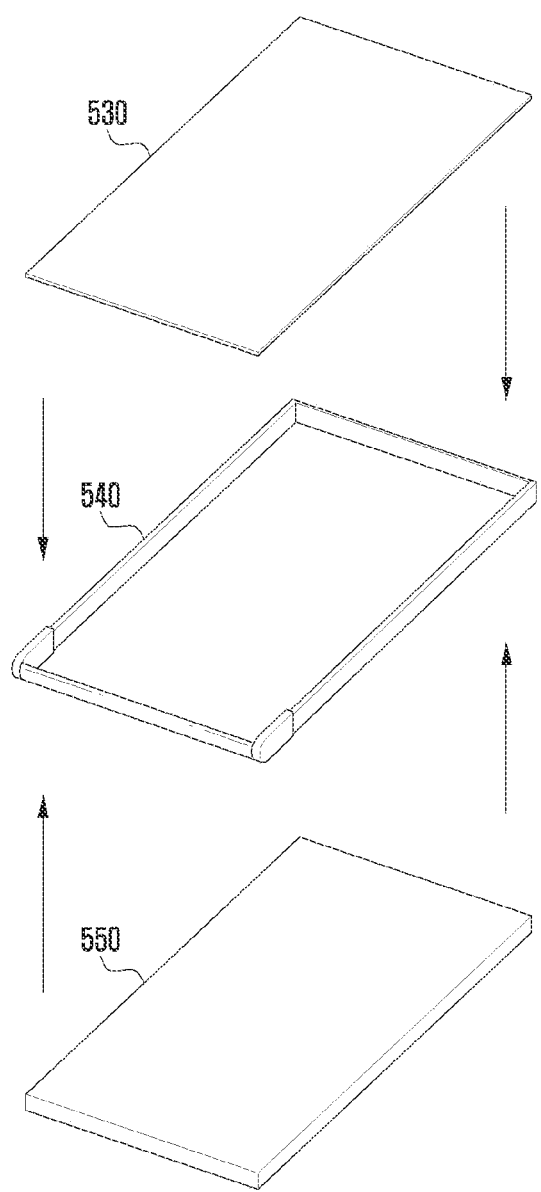

FIG. 5C illustrates a process in which internal components of the electronic device are combined.

In one embodiment, the circuit unit 530 is a component in which various modules of the electronic device are electrically connected. The circuit unit 530 may include various modules (not shown) such as a camera module and audio module and processor elements such as a memory and controller.

In one embodiment, the power supply unit 550 may include at least one battery (not shown), a power supply circuit, and a battery charging circuit, disposed in the housing of the electronic device 500 under the control of the controller.

In one embodiment, one surface of the circuit unit 530 and one surface of the power supply unit 550 may be connected to form an assembly of the circuit unit 530 and the power supply unit 550. The assembly can be supported and fixed through the bracket 540 enclosing the side surface of the assembly.

Figure 5D:
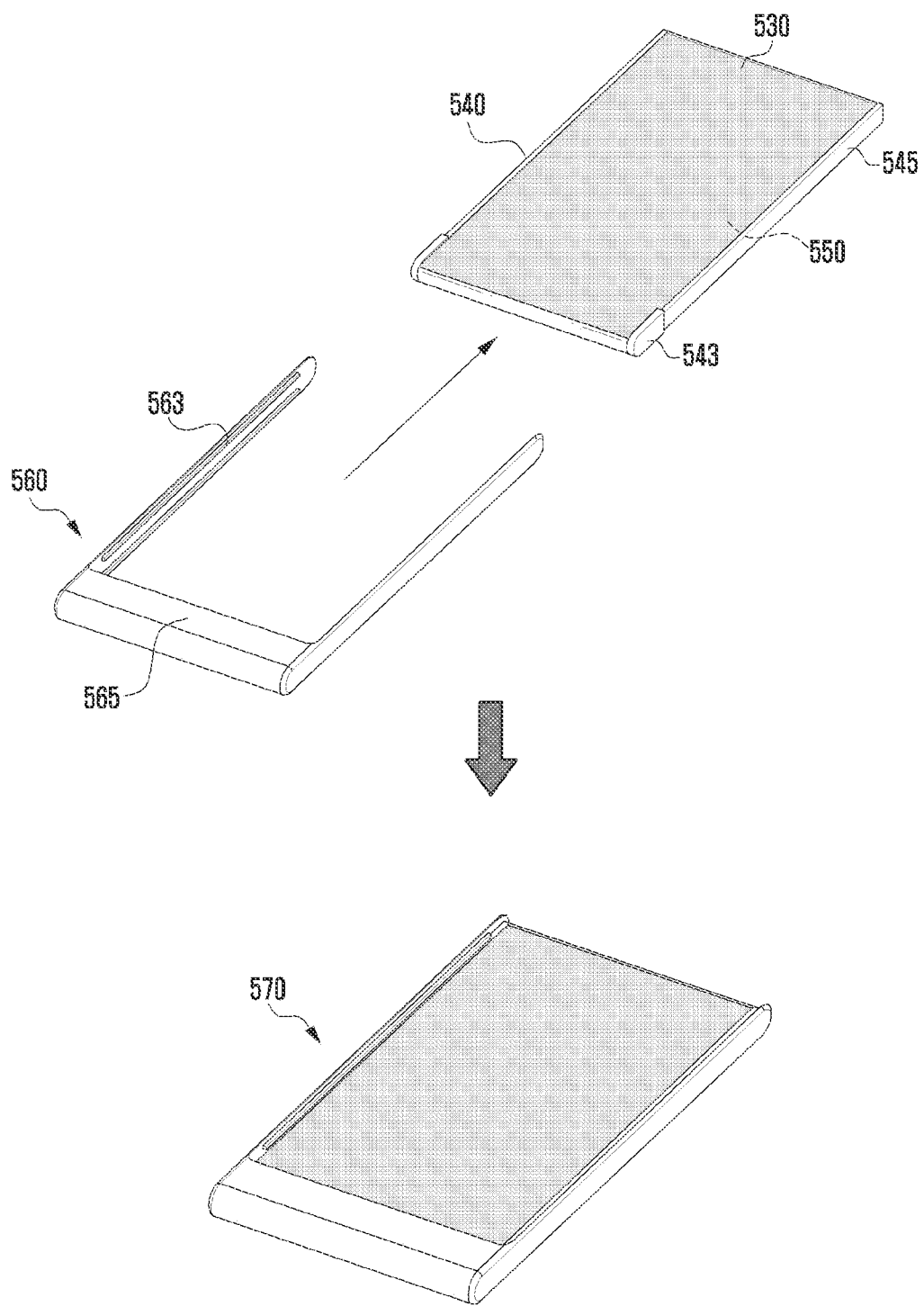

FIG. 5D illustrates a process in which the assembly of internal components of the electronic device is mounted on the outer housing. The internal components including the assembly of the circuit unit 530 and the power supply unit 550 and the bracket 540 supporting the above assembly shown in FIG. 5C are coupled to each other to form an assembly 570 composed of the bracket 540 and the outer housing 560.

In one embodiment, a rail-shaped member 563 is provided on both side elongated portions of the outer housing 560 so that the bracket 540 can be inserted in a sliding manner and coupled to the outer housing 560. A block portion 543 may be provided at one end of the bracket side surface 545 to facilitate the slidable insertion and allow the bracket 540 to be coupled with the end portion of the outer housing 560. At the end of the rail-shaped member 563 provided on both side elongated portions of the outer housing 560, a fixing portion 565 can be provided so as to fix the inserted bracket 540.

Figure 5E:
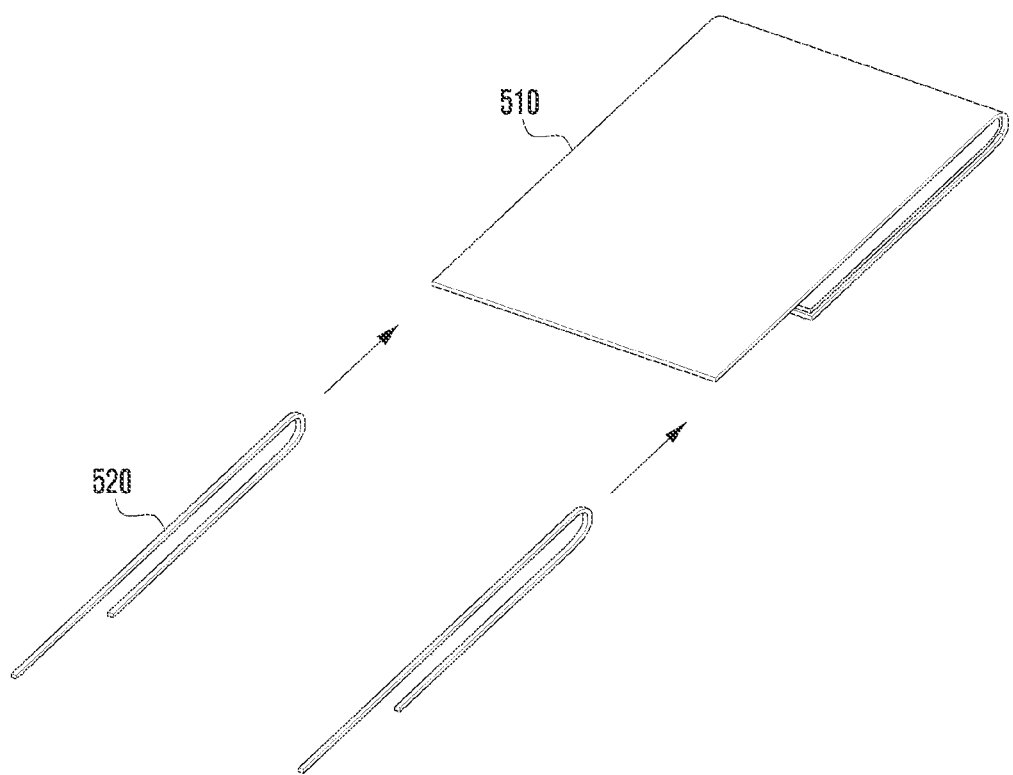

FIG. 5E illustrates a process of providing a fastening member 520 to the display 510 having three planes so that other structures can be coupled to the display 510.

In one embodiment, the display 510 may include three surfaces including front, rear, and side surfaces. The display 510 may be coupled to the outer housing 560 so as to enclose the three sides of the outer housing 560 depending on the structure thereof. A rail-type fastening member 520 may be used to couple together the display 510 having three planes and the outer housing 560. The display 510 and the outer housing 560 can be easily coupled in a sliding manner by using the rail-type fastening member 520.

Figure 5F:
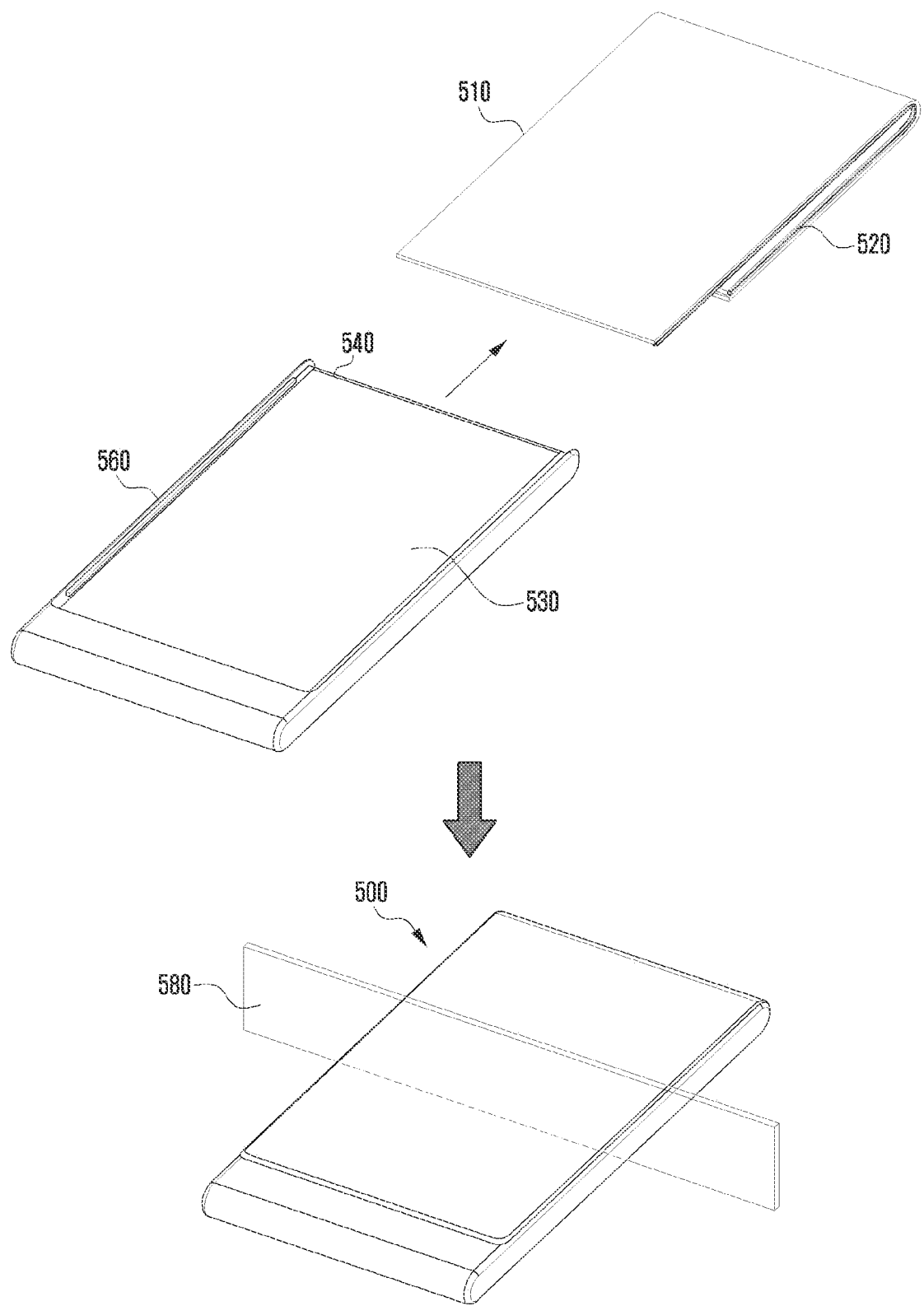

FIG. 5F illustrates a process of coupling the outer housing 560 assembled with the bracket 540 containing internal components and the display 510 having three planes. The display 510 equipped with the fastening member 520 as shown in FIG. 5E can be easily coupled in a sliding manner with the outer housing 560 in which the internal components are mounted. The fixing portion for fixing the coupling may be provided at the end of the fastening member 520 and may be configured to facilitate detachment.

FIG. 5G shows a cross section 580 of the electronic device having multiple displays. With reference to an enlarged view 590 of the fastening portion of the display 510 and the outer housing 560, the fastening member 520 is attached to the display 510 and the fastening member 520 is coupled with a member of the side of the outer housing 560, thereby forming the structure of the electronic device. The coupling structure indicated by indicia 900 is only one embodiment that helps understanding of the assembly of the electronic device described herein, and the coupling structure may include those that can be created by one skilled in the art through changing the design and structure of an embodiment disclosed herein.

FIGS. 6A to 6D are rear perspective views of the electronic device for mounting a camera therein according to various embodiments. In one embodiment, the electronic device may include at least one camera module.

Figure 6A:
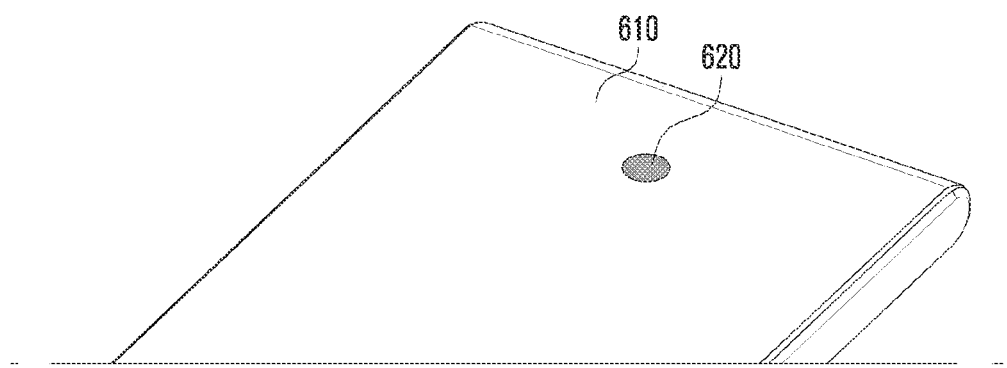
FIGS. 6A to 6D are rear perspective views of the electronic device for mounting a camera therein according to various embodiments.

FIG. 6A illustrates the structure of a camera provided on one side of the electronic device having a multi-plane and single-display configuration. In one embodiment, the camera module includes an optical unit 620 mounted so as to be parallel to at least one surface of the display 610. The surface of the display 610 in which the optical unit 620 is located may have an opening so that the optical unit 620 can be exposed to the outside. The opening provided on at least one surface of the display may be provided in a region of the multi-plane display composed of a display panel and a touch panel.

When the display extending from the front side of the electronic device via the upper portion to the rear side is mounted, the optical unit 620 included in the camera module can be exposed to the outside through the opening provided in a region of the rear display 610. The opening may be adapted to the size of the optical unit (or lens) included in the camera module.

Figure 6B:
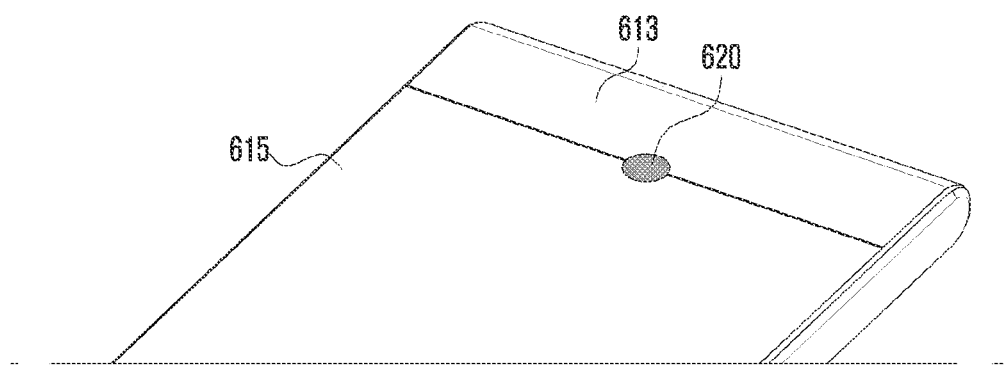

FIG. 6B illustrates the structure of a camera provided on one side of the electronic device having a multi-plane and multi-display configuration. In one embodiment, the electronic device may include a multi-plane display enclosing plural sides thereof, and it may have a structure in which at least two display panels are connected in the region where the optical unit or lens of the camera module is exposed to the outside.

For the electronic device including a camera, two displays 613 and 615 can be connected with respect to the opening through which the optical unit 620 included in the camera module is exposed to the outside. Among the two displays 613 and 615, the first display 613 may refer to the display extending from one side of the electronic device where the camera is not exposed via the upper portion to the upper part of the side where the camera is exposed. The first display 613 and the second display 615 provided in the side where the camera is exposed can be connected to each other, operating as if they are composed of one display panel.

Figure 6C:
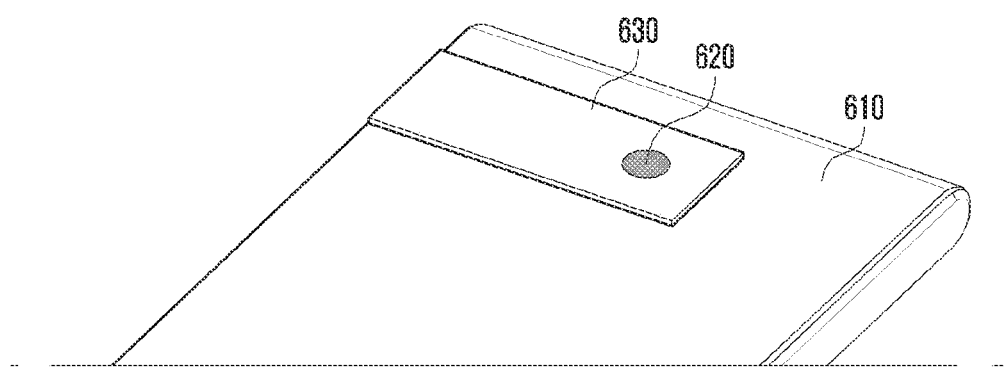

FIG. 6C illustrates the structure of a camera provided on a housing disposed in one side of the electronic device having a multi-plane and single-display configuration. In one embodiment, the optical unit 620 of the camera module may be exposed to the outside through the housing 630 provided in a region of the display in the electronic device. The optical unit and illumination unit of the camera module may be mounted on the housing 630. The housing 630 may be provided in a region of the display so that the screen of the single display 610 is not disconnected.

Figure 6D:
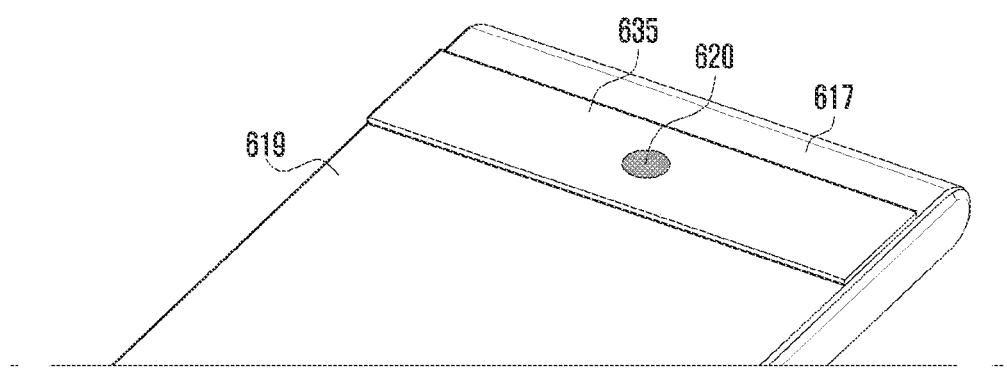

FIG. 6D illustrates the structure of a camera provided on a housing disposed in one side of the electronic device having a multi-plane and multi-display configuration. In one embodiment, for the electronic device having a multi-plane display, a housing 635 through which the optical unit 620 of the camera module can be exposed to the outside may be mounted on one side of the electronic device. The housing 635 may be mounted between plural display panels, and the optical unit and illumination unit of the camera module may be mounted on the housing 635.

Two display panels 617 and 619 may be provided with the housing 635 as the boundary. Among the two display panels 617 and 619, the first display panel 617 may have one side located in an area facing the area where the optical unit 620 of the camera module is exposed to the outside, and the other side extended along the upper portion of the electronic device up to the area where the optical unit 620 is exposed to the outside. The other side of the first display panel 617 may be configured to contact one side of the housing 635, and the other side of the housing 635 may be configured to contact one side of the second display panel 619 located in the area where the optical unit 620 is exposed to the outside.

Figure 7:
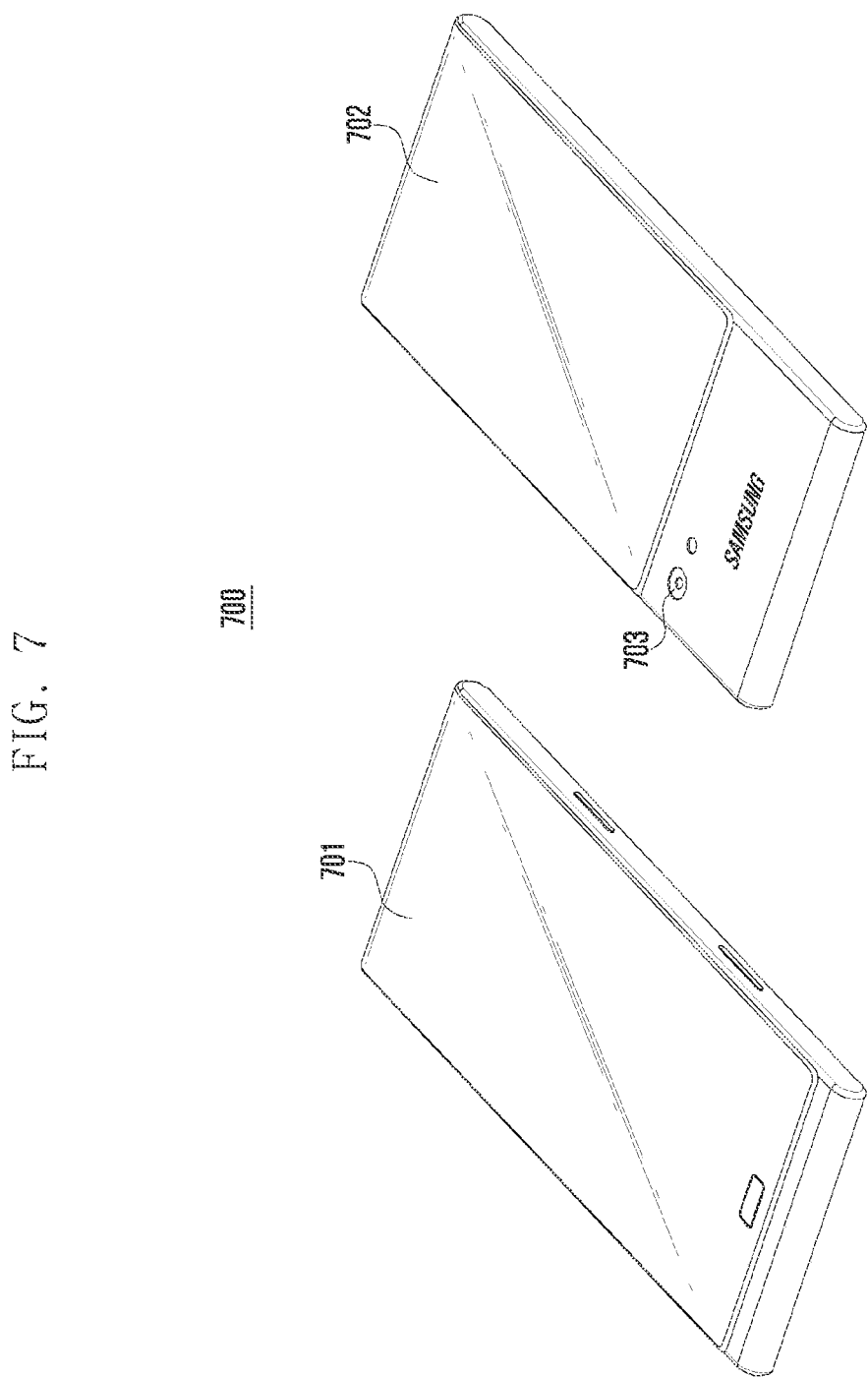
FIG. 7 depicts mounting of a camera at a portion of the housing of the electronic device according to various embodiments.

FIG. 7 depicts mounting of a camera at a portion of the housing of the electronic device according to various embodiments. In one embodiment, for the electronic device 700 having a multi-plane display, the front display 701 may extend along the upper portion of the electronic device to the rear display 702, and the sizes of the front display 701 and the rear display 702 may be different.

Unlike the front display 701 that covers most of the front side of the electronic device, the rear display 702 can be configured to cover only a part of the rear surface of the electronic device. Here, the remaining portion of the rear surface excluding the portion of the rear display 702 may be configured as an outer housing. The camera 703 can be mounted in the outer housing area, and the illumination unit can be further mounted.

Figure 8A:
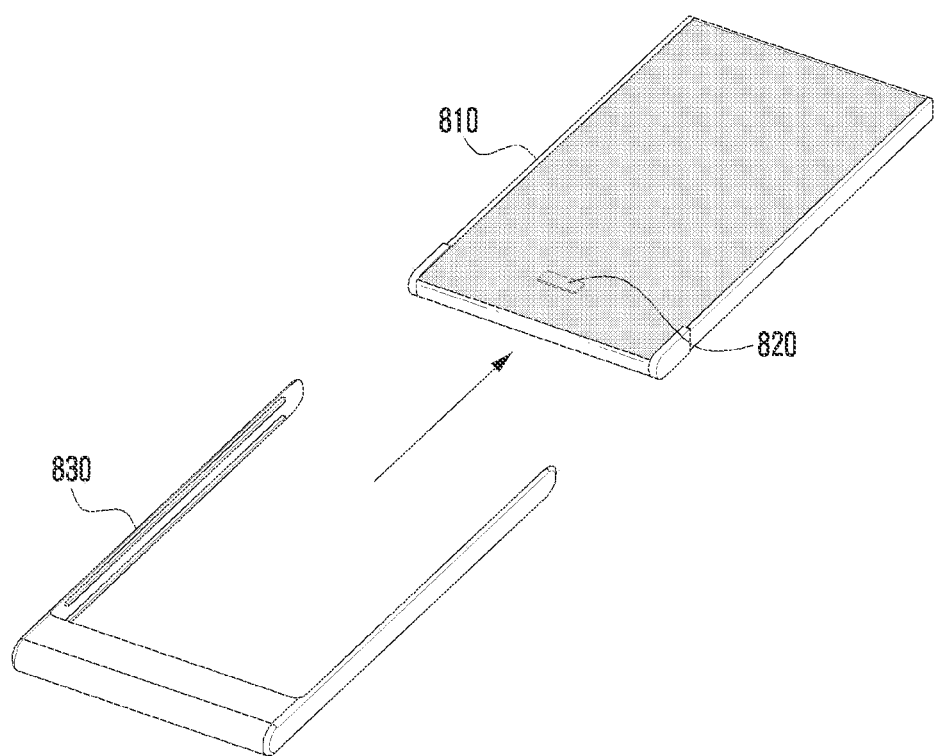
FIGS. 8A to 8C are front perspective and side views of the electronic device for mounting a speaker therein according to various embodiments.
Figure 8B:
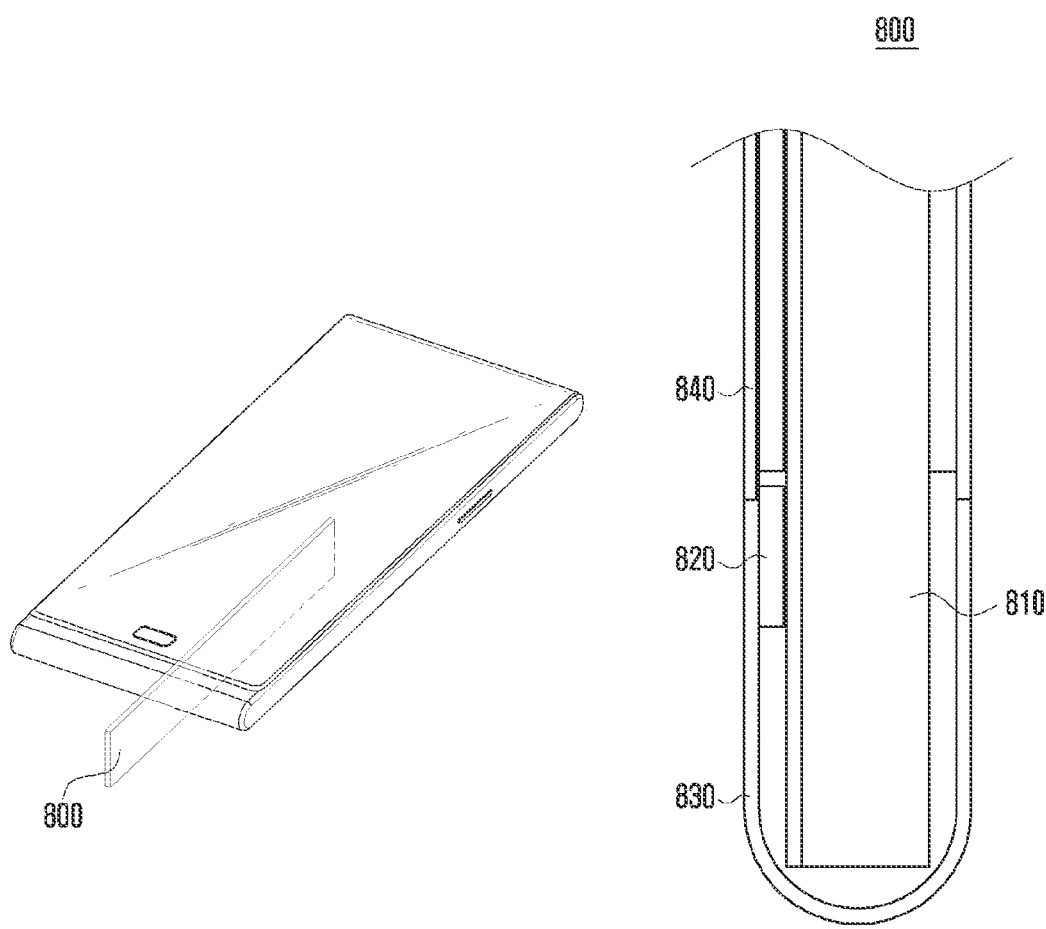
Figure 8C:
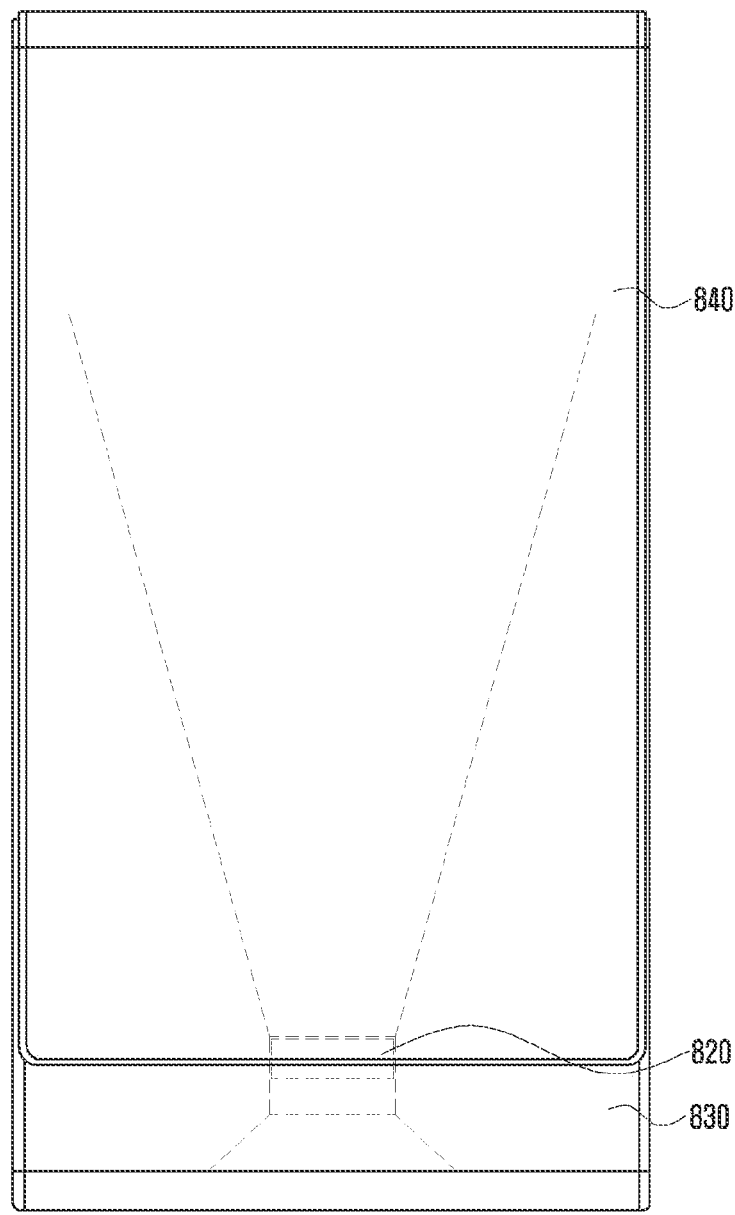

FIGS. 8A to 8C are front perspective and side views of the electronic device for mounting a speaker therein according to various embodiments.

FIG. 8A illustrates an acoustic module disposed at the circuit unit of the electronic device according to an embodiment. In one embodiment, among the internal components 810 such as the circuit unit, power supply unit, and bracket, an acoustic module 820 may be provided on the circuit unit. The acoustic module may be mounted in contact with the display at the bottom of the display, and it may vibrate the display to generate sounds.

Piezo techniques may be applied to the acoustic module. A vibration film coupled to a piezoelectric element can be vibrated by the vibration of the piezoelectric element to generate sounds. The piezo element may be mounted at a portion of the bottom of the display, and the display surface may be used as a vibration film so that the entire display can act as a speaker. When a call is being processed, only the user whose ear is brought in direct contact with the vibrating display may be able to hear the sound.

FIG. 8B is a side view of the cut surface 800 of the electronic device in which the acoustic module is mounted at the bottom of the display. In one embodiment, the acoustic module 820 may be mounted on the internal components 810 such as the circuit unit and be configured to contact a portion of the outer housing 830 and a portion of the display 840. The acoustic module 820 may generate a sound by vibrating the display 840 under the control of the controller and may generate a sound by vibrating the outer housing 830 according to the settings.

By mounting the speaker inside the electronic device, it is possible to generate sounds without exposing the speaker to the outside through an opening created in a region of the display.

FIG. 8C is a front view of the electronic device in which the acoustic module is mounted on the bottom portion of the display. In one embodiment, the speaker can be implemented without an opening in the electronic device having a multi-plane display by using the display 840 and the acoustic module 820 mounted inside the outer housing 830.

It is possible to realize both a speaker function for a call and a speaker function for outputting sounds to the outside by making a space to utilize the resonance effect around the acoustic module or by adjusting the region in contact with the display 840 and the outer housing 830 serving as a vibration film.

Figure 9:
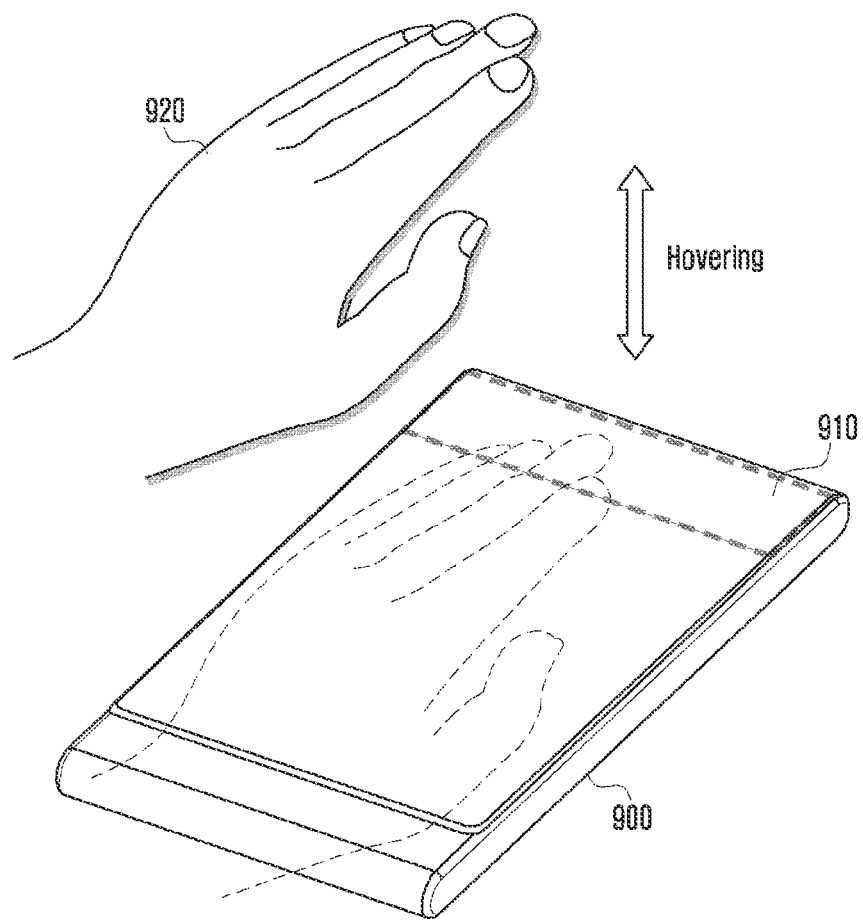
FIG. 9 illustrates a proximity sensor mounted in the electronic device according to various embodiments.

FIG. 9 illustrates a proximity sensor mounted in the electronic device according to various embodiments. In one embodiment, the electronic device includes a display having three planes. The electronic device having the above configuration may sense internal or external actions using a sensor mounted inside the display.

In one embodiment, to sense an object 920 approaching the electronic device 900, the electronic device 900 may include a proximity sensor 910 at the bottom of the display.

A hovering sensor capable of sensing the approach or position of an object without direct contact may be used as the proximity sensor 910.

Here, hovering may mean that an electronic pen or a portion of the body is spaced apart from the user input module of the electronic device within a preset interval. For example, when the electronic pen or a portion of the body is separated from the pen sensor of the electronic device within a preset distance, hovering may correspond to the recognition of this state of separation. The distance by which the pen sensor or other sensor (not shown) can detect the state of separation in this way can be generally within 2 to 5 cm. However, the hovering distance may become longer if it is possible to detect a greater distance of separation as the sensor technology improves.

The hovering sensor may be included at the bottom of at least one display among the multi-planes of the display. The hovering sensor may be provided under all of the first to third displays, in which case the hovering sensor may be used for determining which display to activate. When the user grips the electronic device by hand, the hovering sensor can be used to identify the side of the electronic device being touched.

When the user is holding the electronic device, as the display facing the palm of the hand holding the electronic device is highly likely not to be used, the display located on the opposite side of the display facing the palm can be activated.

Figure 10:
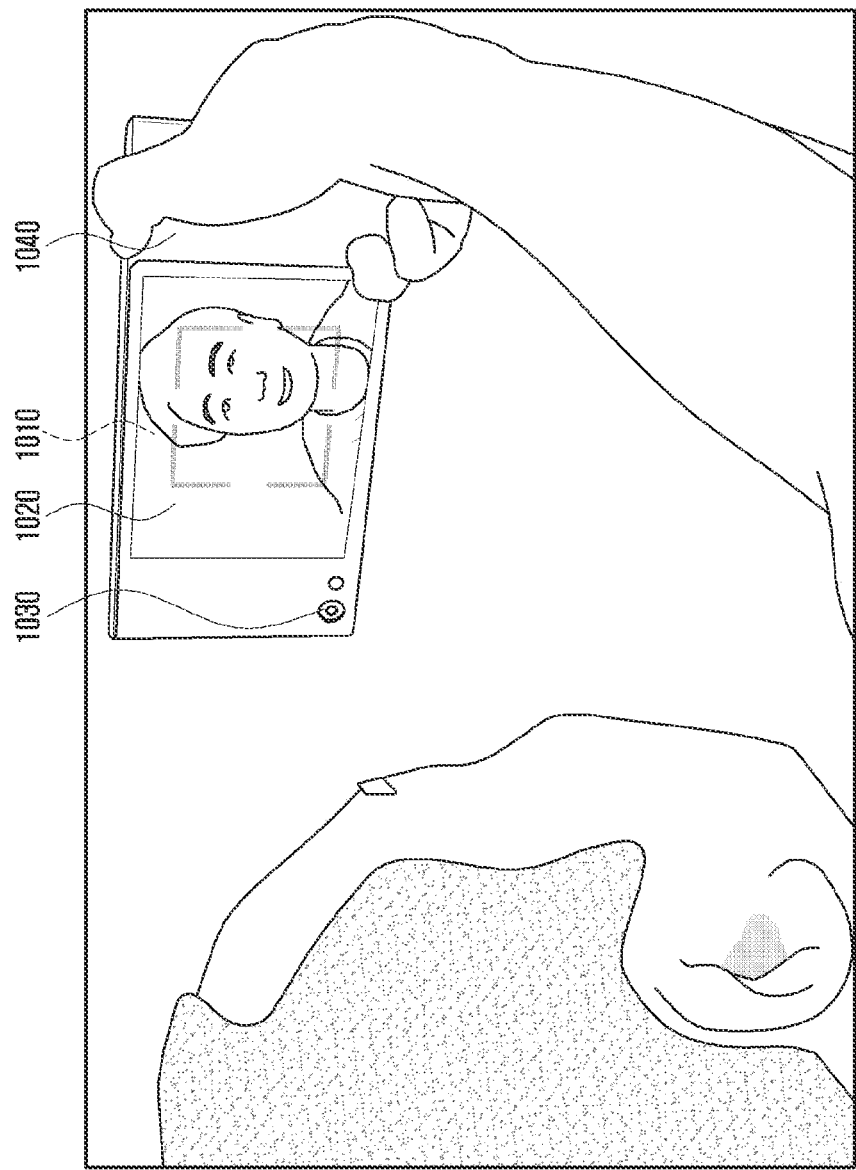
FIG. 10 illustrates a method of self-photographing using the camera of the electronic device according to various embodiments.

FIG. 10 illustrates a method of self-photographing using the camera of the electronic device according to various embodiments. In one embodiment, for the electronic device having multiple displays, the camera 1030 may be provided in the direction in which the rear display 1020 is mounted. To take a self-portrait photograph, when the user selects the self-photographing mode of the electronic device and places the camera 1030 in the direction of the user, the preview image obtained by the camera 1030 can be displayed on the rear display 1020 in the same direction as the camera 1030.

Figure 11:
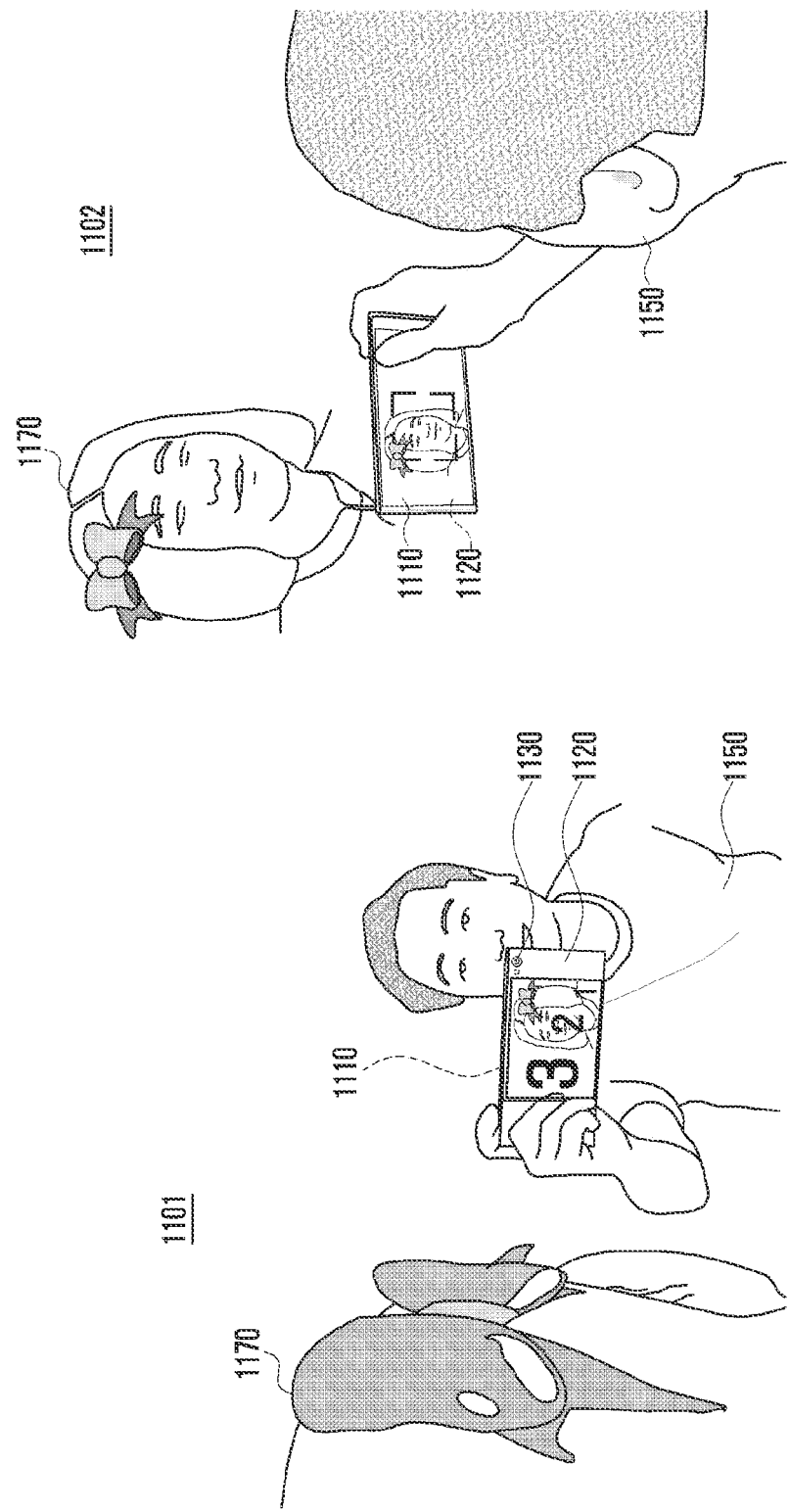
FIG. 11 illustrates a method of photographing using the camera of the electronic device according to various embodiments.

FIG. 11 illustrates a method of photographing using the camera of the electronic device according to various embodiments. In one embodiment, for the electronic device having multiple displays, the front display 1110 and the rear display 1120 may be provided and the camera 1130 may be mounted in the same direction as the rear display 1120. When the first user 1150 uses the electronic device to take a photograph of the second user 1170, the first user 1150 may hold the electronic device so that the camera 1130 faces the second user 1170.

As indicated by indicia 1101, the preview image of the second user 1170 obtained by the camera 1130 can be displayed on the rear display 1120 in the same direction as the camera 1130. The second user 1170 acting as a target object can view the preview image on the rear display 1120.

As indicated by indicia 1102, the first user 1150, who takes a photograph of the second user 1170 using the electronic device, may view the preview image 1110 of the target object through the front display 1110 provided in the direction opposite to the direction in which the camera 1130 is mounted.

Figure 12:
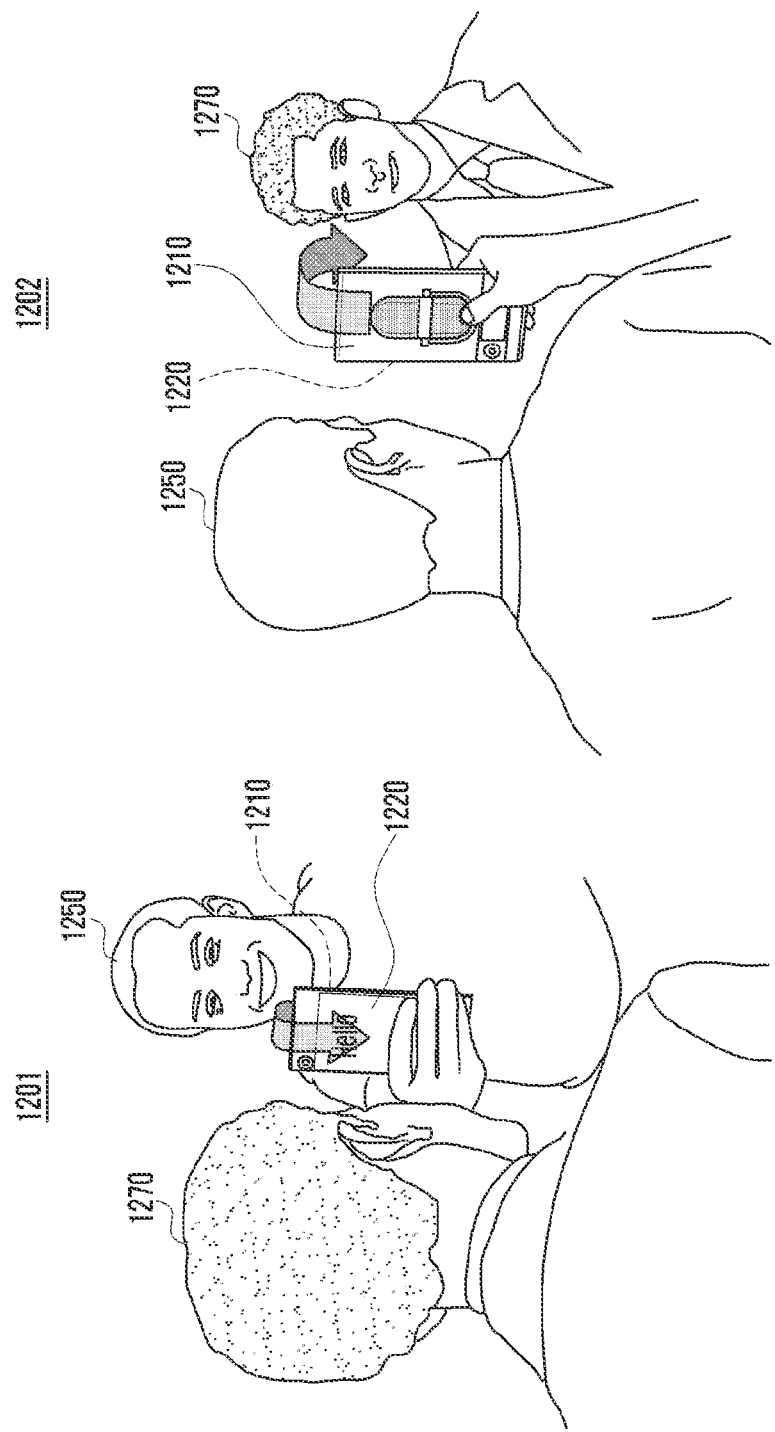
FIG. 12 illustrates an example of simultaneous interpretation using the electronic device according to various embodiments.

FIG. 12 illustrates an example of simultaneous interpretation using the electronic device according to various embodiments. In one embodiment, for the electronic device having multiple displays, the front display 1210 and the rear display 1220 may be provided.

As indicated by indicia 1201, the rear display 1220 of the electronic device is located in the direction in which the second user 1270 is looking, and translation results for what the first user 1250 speaks may be displayed on the rear display 1220. In one embodiment, after the first user 1250 speaks, when a finger or the like touches the display located on the upper side of the electronic device and moves toward the rear display 1220 (drag action) at which the second user 1270 is looking, translation results for what the first user 1250 speaks may be displayed on the rear display 1220.

Likewise, as indicated by indicia 1202, when the first user 1250 speaks to the second user 1270 in her or his native language while looking at the front display 1210, what the first user 1250 speaks may be translated into the preset language and the translation results may be displayed on the rear display 1220 at which the second user 1270 is looking.

The above example may proceed in the opposite direction. When the second user 1270 speaks to the first user 1250 while looking at the rear display 1220, what the second user 1270 speaks may be translated and the translation results may be displayed on the front display 1210 at which the first user 1250 is looking.

Figure 13:
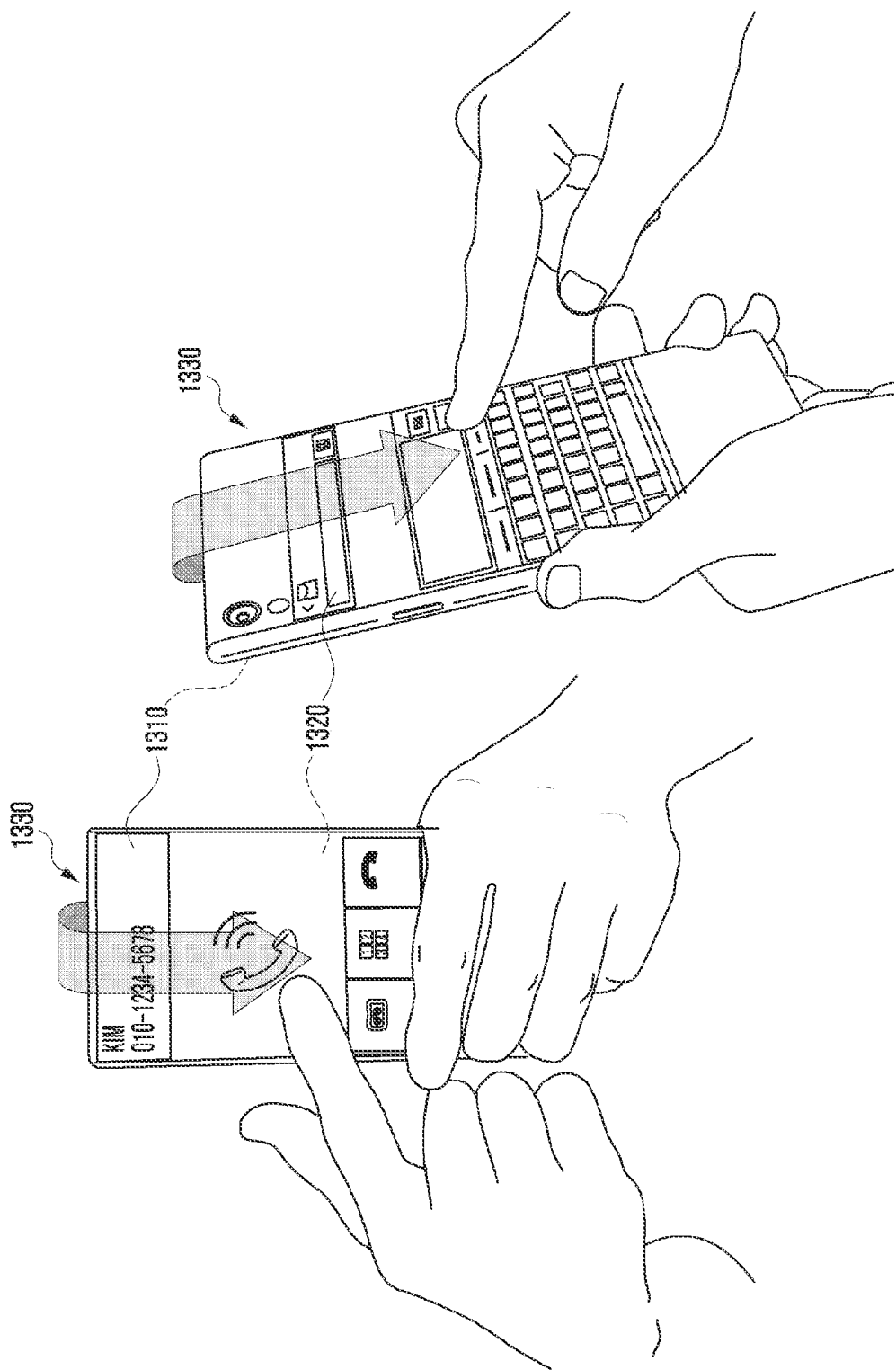
FIG. 13 illustrates a result of a drag action applied to the electronic device according to various embodiments.

FIG. 13 illustrates a result of a drag action applied to the electronic device according to various embodiments. In one embodiment, for the electronic device having multiple displays, the front display 1310 may extend along the upper portion 1330 of the electronic device to the rear side 1320. The display area 1330 provided at the upper portion of the electronic device may display information on a missed call or a received message and may serve as a notification bar.

For example, when a log of a missed call is displayed on the display area 1330 provided at the upper portion, the user may touch the displayed log and drag it in the direction of the front display 1310 to make a call to the caller of the missed call. When the user touches the displayed log and drags it in the direction of the front display 1310, an application may be executed to send a message to the caller of the missed call.

Such a drag action is normally performed while the display is being touched. However, when a proximity sensor such as a hovering sensor is mounted in the electronic device, the drag operation can be activated even if only a drag gesture is performed without direct contact with the display. The function of executing the call function or message application in the above example may be replaced with a different function according to user settings.

The above drag action is merely an example of operating the electronic device disclosed herein. The action of shaking the electronic device in one direction or turning over the notebook page while holding the electronic device may be used.

Figure 14:
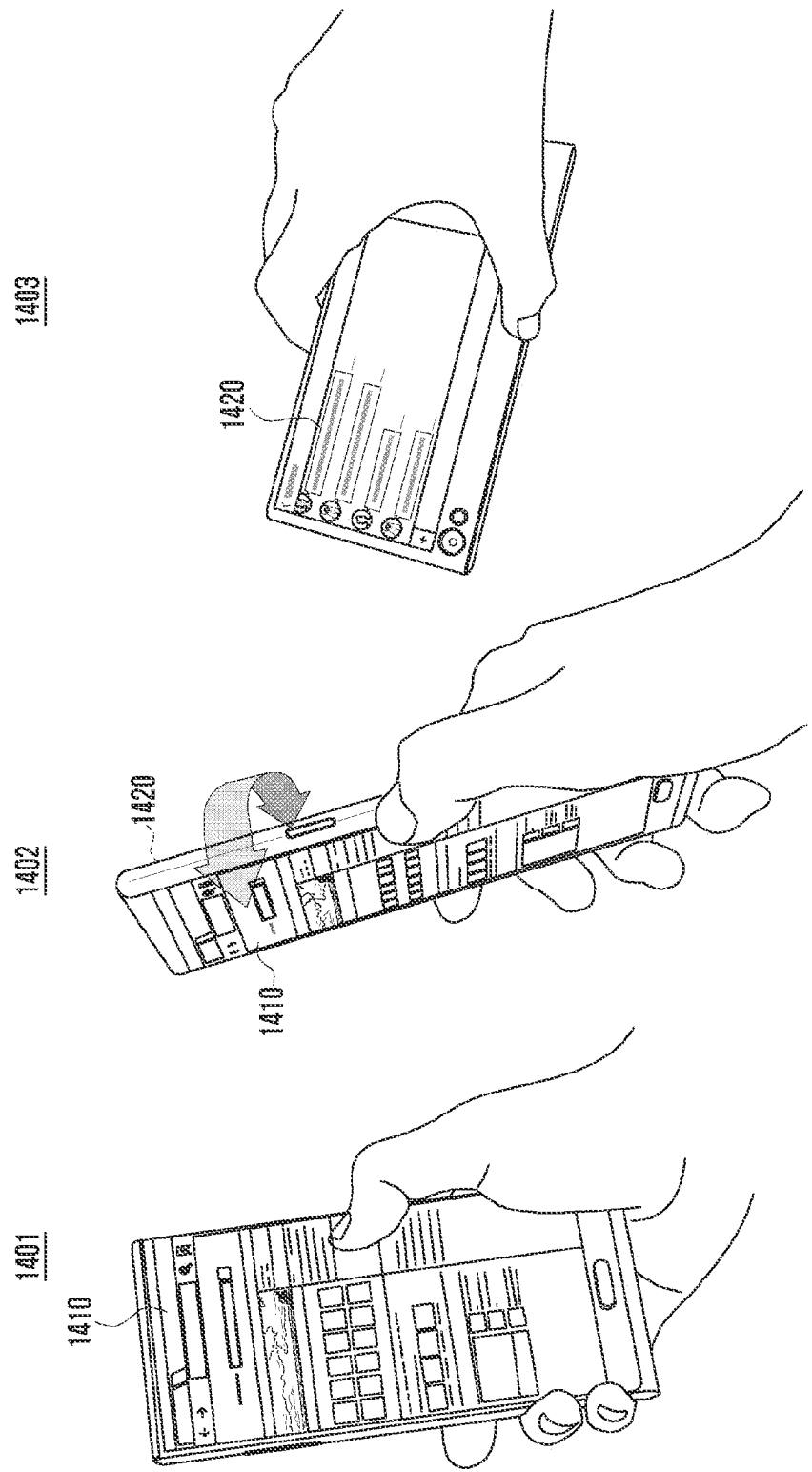
FIG. 14 illustrates an action for checking all the multi-plane displays of the electronic device while the user grips the electronic device according to various embodiments.

FIG. 14 illustrates an action for checking all the multi-plane displays of the electronic device while the user grips the electronic device according to various embodiments. In one embodiment, when multitasking is performed in the electronic device having multiple displays, information on the tasks can be simultaneously presented on the plural displays provided in the electronic device.

As indicated by indicia 1401, while a first task is being executed using the front display 1410 provided in the electronic device, the user can initiate a second task by executing another application. In this case, the electronic device can display the newly executed second task through the rear display 1420 without terminating the first task being executed using the front display 1410. The user can simultaneously execute plural tasks while holding the electronic device.

The front display 1410 and the rear display 1420 may be independently operated for multitasking. The rear display 1420 may also serve as an auxiliary display of the front display 1410. For example, the rear display 1410 may display a folder associated with the program running on the front display 1410. In various embodiments, it is possible to provide a shortcut user interface (UI) in the form of an index through the rear display 1410.

Figure 15:
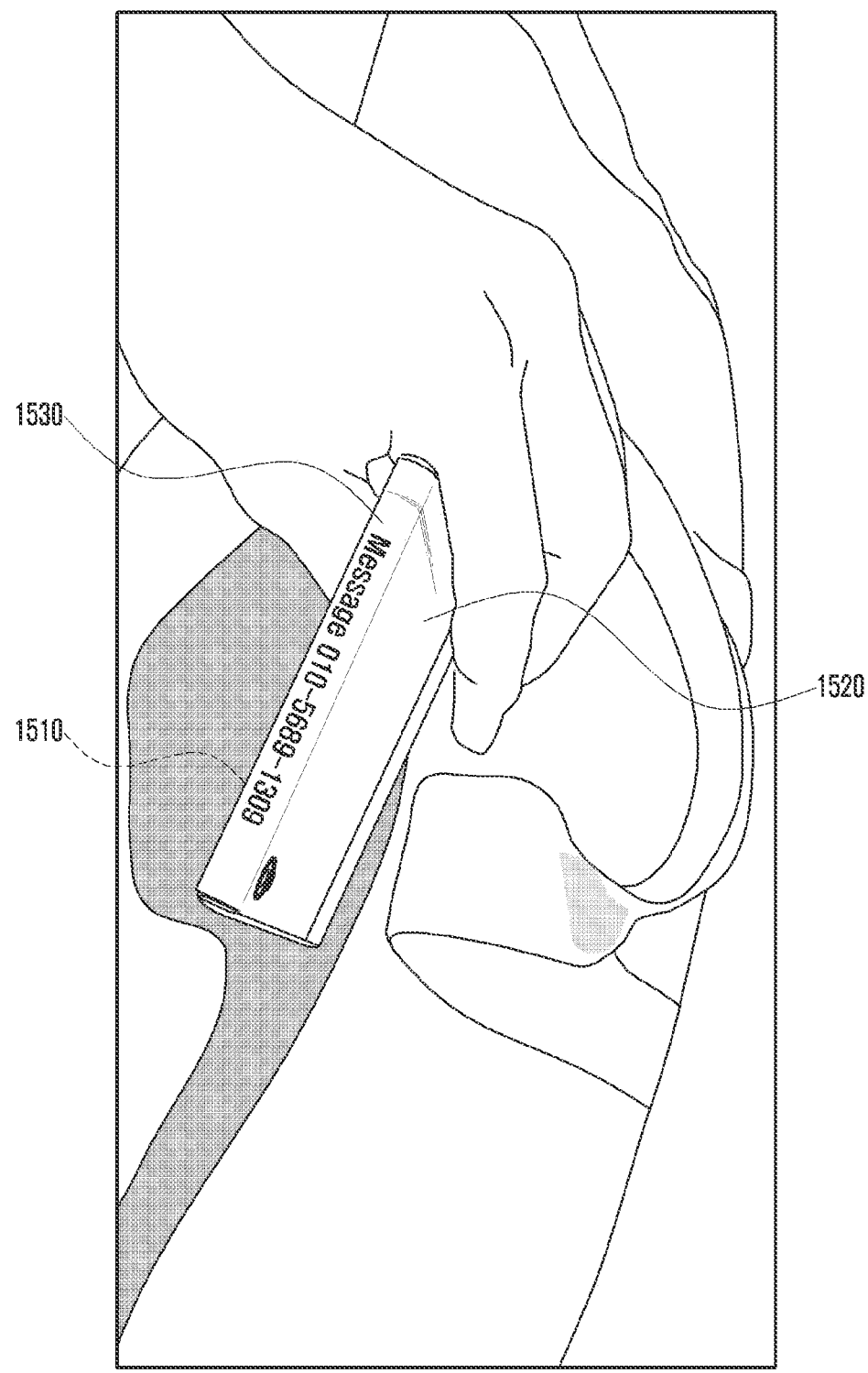
FIG. 15 illustrates a display installed in the upper side of the electronic device according to various embodiments.

FIG. 15 illustrates a display installed in the upper side of the electronic device according to various embodiments. In one embodiment, for the electronic device having multiple displays, the front display 1510 may extend along the upper side 1530 of the electronic device to the rear side 1520.

The display 1530 provided on the upper side of the electronic device may be implemented in a curved shape or plane shape depending on the curvature. The upper-side display 1530 may be used to display data such as messages and weather information, and may serve as a notification bar. The user can check the data through the upper-side display 1530 without taking the electronic device completely out of the pocket.

The upper-side display 1530 may provide a spatial sensation like a wheel UI and may be used as an input means for the electronic device.

Figure 16:
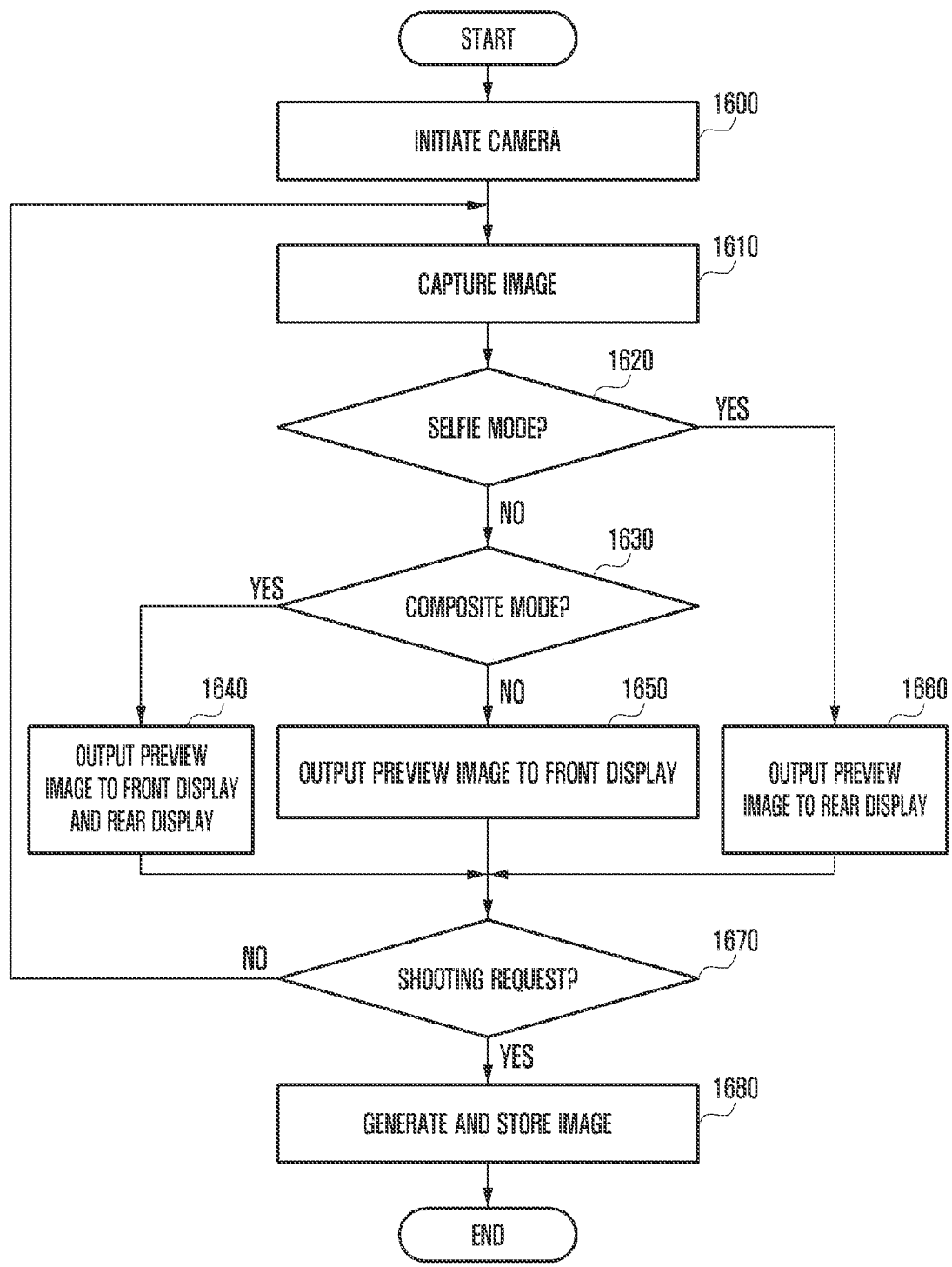
FIG. 16 is a flowchart for executing a camera function of the electronic device according to various embodiments.

FIG. 16 is a flowchart for executing a camera function of the electronic device according to various embodiments. In one embodiment, the electronic device having multi-plane displays may start capturing images when the camera provided on at least one of the displays is driven. After starting image capturing at operation 1610, the electronic device may identify the shooting mode of the user. For example, at operation 1620, the electronic device may determine whether the user wants to take a self-portrait photograph (selfie). If the self-portrait mode is selected, the controller of the electronic device may activate the rear display provided in the same direction as the direction in which the camera is mounted. At operation 1660, the preview image thus generated may be displayed on the activated rear display.

At operation 1630, the composite mode other than the self-portrait mode may be selected. In the composite mode (dual mode), both the front display and the rear display of the electronic device are activated and the preview image obtained by the camera is displayed on both of the activated displays. The composite mode may be used when two or more users take a photograph while the electronic device is being placed between the users. For example, when the first user takes a photograph of the second user, the camera of the electronic device is positioned to face the second user. In this case, the second user can view his or her current appearance in real time through the rear display provided in the same direction as the direction in which the camera is mounted. At the same time, the first user may view the captured image through the front display provided in the direction opposite to the direction in which the camera is mounted.

If the composite mode is selected at operation 1630, at operation 1640, the preview image generated may be displayed through the front display and the rear display of the electronic device. If neither the self-portrait mode nor the composite mode is selected at operation 1620 or 1630, the regular shooting mode may be selected. In the regular shooting mode, the preview image may be displayed on the front display only.

After checking the preview image, at operation 1670, the controller of the electronic device may take a photograph in response to a shooting request from the user, and generate and store the corresponding image.

Here, the front side refers to the side or face on which the main display mostly used by the user is located, and it may be the side or face on which a physical button such as the home button is usually located. In one embodiment, the front side and the rear side may be distinguished according to, but not limited to, the presence of a physical button or the location where the camera is mounted.

Also, in embodiments shown in the drawings, the front side may correspond to, but not limited to, the side on which the camera is not exposed.

Figure 17:
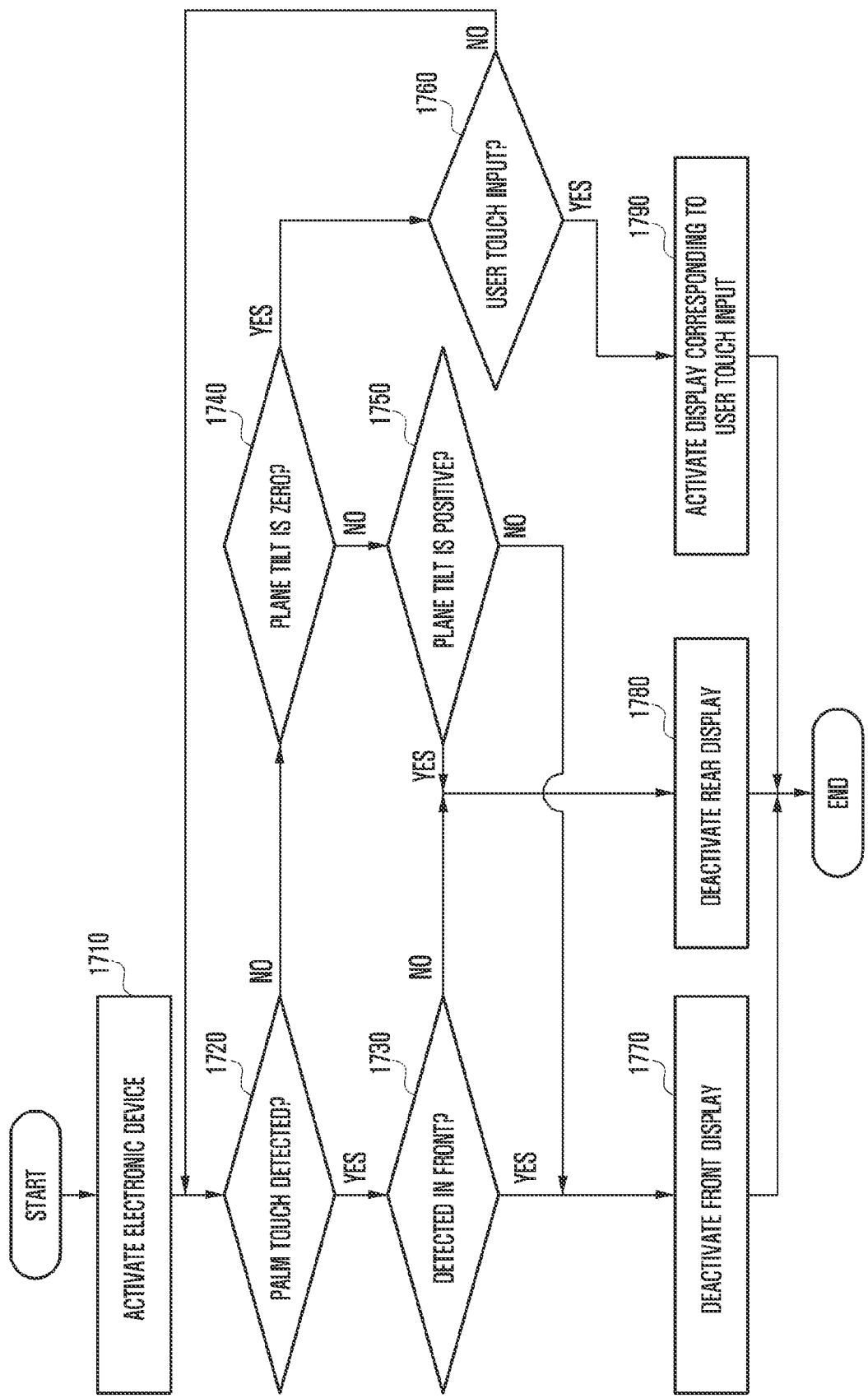
FIG. 17 is a flowchart for operating the displays of the electronic device disclosed herein.

FIG. 17 is a flowchart for operating the displays of the electronic device disclosed herein.

In one embodiment, after the touchscreen of the electronic device is activated, at operation 1720, the electronic device may determine whether a palm touch signal (or regular signal) is detected through the installed sensors. A palm touch signal may generally be sensed when the user grips the electronic device by hand, or it may be sensed when an input is received through a specific object such as a touch pen. A palm touch signal can be sensed through the sensors when a specific portion of the electronic device is being continuously touched.

If a palm touch signal is detected, at operation 1730, the electronic device may determine whether the palm touch signal has been sensed in the front side or in the rear side. Based on the result of the determination, the display facing the palm may be not activated and the other display facing away from the palm-facing display may be activated. This is because the display facing the palm may be not used when the user is holding the electronic device.

For example, to use the front display of the electronic device, the user may hold the electronic device so that the rear side of the electronic device is supported by the palm of the hand. Here, a palm touch signal can be detected in the direction of the rear display. On the other hand, when the user grips the electronic device to use the rear display, a palm touch signal may be detected in the direction of the front display.

Depending on the palm touch direction sensed at operation 1730, the electronic device may deactivate the front display at operation 1770 or may deactivate the rear display at operation 1780.

If no palm touch signal is detected at operation 1720, the electronic device may measure the plane tilt thereof and select the display to be activated. Here, when the display surface of the electronic device is represented by an X-Y plane, the plane tilt may refer to the angle between the Z-axis perpendicular to the X-Y plane and the ground surface. When the electronic device is placed on the ground with the front display facing up, the plane tilt of the electronic device is 90 degrees. Hence, when the plane tilt is 0 (zero), this indicates that the surface of the display of the electronic device is perpendicular to the ground surface.

Upon determining that the measured plane tilt is zero at operation 1740, the electronic device may activate the display corresponding to the direction in which user touch input is detected. On the other hand, when the plane tilt is nonzero, this may indicate that one of the front display and the rear display of the electronic device faces upward.

Upon determining that the measured plane tilt has a positive value at operation 1750, it may be determined that the front display of the electronic device faces the direction opposite to the ground. In this case, at operation 1780, the electronic device may deactivate the rear display.

Upon determining that the measured plane tilt has a negative value at operation 1750, it may be determined that the front display of the electronic device faces the ground. In this case, at operation 1770, the electronic device may deactivate the front display.

Figure 18:
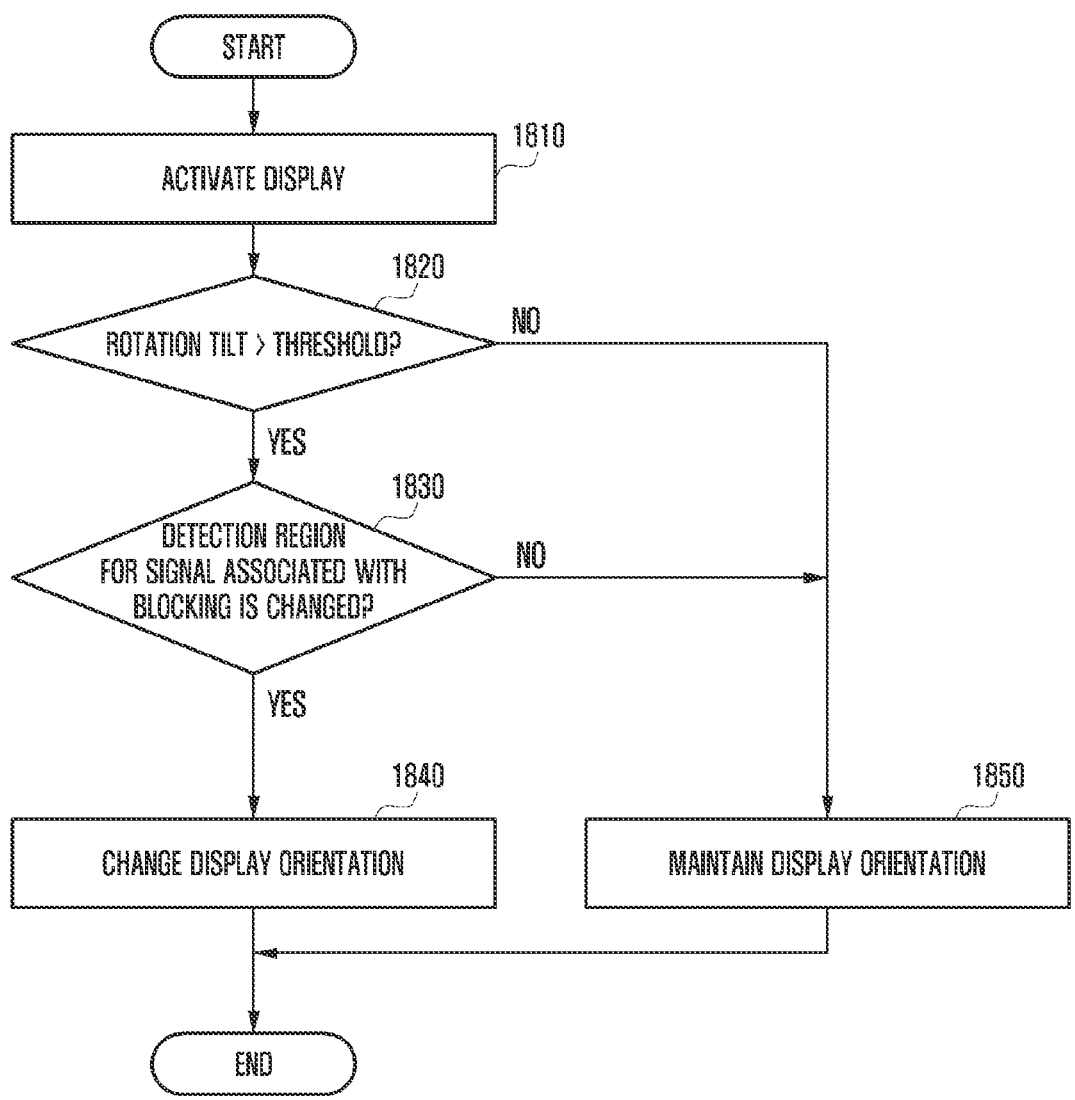
FIG. 18 is a flowchart for changing the direction of the displayed screen in response to a direction change of the electronic device disclosed herein.

FIG. 18 is a flowchart for changing the direction of the displayed screen in response to a direction change of the electronic device disclosed herein.

In one embodiment, when the user changes the orientation of the electronic device, at operation 1820, the electronic device may determine if the rotation tilt exceeds a preset threshold. Here, when the display surface of the electronic device is represented by an X-Y plane and one of the X-axis and the Y-axis is defined as the reference axis, the rotation tilt indicates the degree of rotation of the reference axis.

Upon determining that the rotation tilt exceeds the threshold, at operation 1830, the electronic device may determine whether the direction of the palm touch signal has changed. Upon determining that the direction of the palm touch signal has changed also, at operation 1840, the electronic device may change the orientation of the screen displayed on the display.

For example, while the user is executing a first task through the front display of the electronic device, the user can reverse the electronic device to check a second task executed through the rear display. When the reversing action is detected, the rotation tilt may exceed the threshold. In that case, the electronic device may determine whether the direction of the palm touch signal has changed at operation 1830. If the user holds the electronic device in the same way while reversing the electronic device, as it can be determined that the direction of the palm touch signal is not changed, at operation 1850, the orientation of the screen displayed on the display may be maintained.

Upon determining that the rotation tilt does not exceed the threshold, at operation 1850, the electronic device may maintain the current orientation of the screen displayed on the display.

Although the structure of the electronic device of the present invention has been described in brief, it should be understood that each of the above-described components can be further subdivided or some thereof may can be combined into one or more modules according to the decision of a person skilled in the art.

Hereinabove, various embodiments of the present invention have been shown with reference to the accompanying drawings and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

What is claimed is:

1. An electronic device comprising:
a display including a first surface in a first direction, a second surface in a second direction opposite to the first direction, and a third surface enclosing at least a portion of a space formed between the first surface and the second surface;
an audio module changing an audio signal that is input to the electronic device into an electronic signal; and
a processor being operationally connected to the display and the audio module,
wherein the processor is configured to detect the audio signal input via the audio module from a first user via the first surface, detect a touch signal dragged from the third surface in the direction of the second surface, and display in the second surface a translation corresponding to the audio signal,
wherein the third surface displays information on a missed call or a received message, and
wherein the processor is further configured to perform a telephone call to a telephone number corresponding to the missed call when the missed call is displayed in the third surface and a touch signal dragged from the third surface in the direction of the first surface is detected.

2. The electronic device of claim 1, wherein the processor is further configured to execute an application for transmitting the telephone number corresponding to the missed call through a message when the missed call is displayed in the third surface and the touch signal dragged from the third surface in the direction of the second surface is detected.

3. The electronic device of claim 1, wherein the processor is further configured to execute a first application in the first surface and a second application in the second surface.

4. The electronic device of claim 1, wherein the processor is further configured to perform an independent operation for the first surface and the second surface to multitask.

5. The electronic device of claim 1, wherein the first surface includes a first antenna, the second surface includes a second antenna, the third surface includes a third antenna, and the first antenna, the second antenna, and the third antenna operate independently.

6. The electronic device of claim 1, wherein the space formed between the first surface and the second surface includes a camera module operationally connected to the processor.

7. The electronic device of claim 1, wherein the display comprises:
a display panel;
a first shield layer located on top of the display panel;
an antenna located on top of the first shield layer;
a second shield layer located on top of the antenna; and
a touch panel located on top of the second shield layer.

8. The electronic device of claim 7, wherein the antenna has a metal mesh shape.

9. A method of controlling an electronic device equipped with a display including a first surface in a first direction, a second surface in a second direction, and a third surface enclosing at least a portion of a space formed between the first surface and the second surface, wherein the third surface displays information on a missed call or a received message, the method comprising:
detecting an audio signal input via an audio module from a first user via the first surface;
detecting a touch signal dragged from the third surface in the direction of the second surface;
displaying in the second surface a translation corresponding to the audio signal; and
performing a telephone call to a telephone number corresponding to the missed call when the missed call is displayed in the third surface and a touch signal dragged from the third surface in the direction of the first surface is detected.

10. The method of claim 9, further comprising executing an application for transmitting the telephone number corresponding to the missed call through a message when the missed call is displayed in the third surface and the touch signal dragged from the third surface in the direction of the second surface is detected.

11. The method of claim 9, further comprising executing a first application in the first surface and executing a second application in the second surface.

12. The method of claim 9, further comprising performing an independent operation for the first surface and the second surface to multitask.

13. The method of claim 9, wherein the first surface includes a first antenna, the second surface includes a second antenna, the third surface includes a third antenna, and the first antenna, the second antenna, and the third antenna operate independently.

14. The method of claim 9, wherein the space formed between the first surface and the second surface includes a camera module operationally connected to the processor.

15. The method of claim 9, wherein the display comprises:
- a display panel;
- a first shield layer located on top of the display panel;
- an antenna located on top of the first shield layer;
- a second shield layer located on top of the antenna; and
- a touch panel located on top of the second shield layer.

16. The method of claim 15, wherein the antenna has a metal mesh shape.

* * * * *